(12) United States Patent
Dean et al.

(10) Patent No.: US 9,536,263 B1
(45) Date of Patent: Jan. 3, 2017

(54) DEBT SERVICES CANDIDATE LOCATOR

(71) Applicant: CONSUMERINFO.COM, INC., Costa Mesa, CA (US)

(72) Inventors: Michael John Dean, Torrance, CA (US); Mark Joseph Kapczynski, Santa Monica, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 14/280,527

(22) Filed: May 16, 2014

Related U.S. Application Data

(62) Division of application No. 13/651,127, filed on Oct. 12, 2012, now Pat. No. 8,738,516.

(60) Provisional application No. 61/546,898, filed on Oct. 13, 2011.

(51) Int. Cl.
  *G06Q 40/00* (2012.01)
  *G06Q 40/02* (2012.01)

(52) U.S. Cl.
  CPC .................. *G06Q 40/025* (2013.01)

(58) Field of Classification Search
  CPC ........ G06Q 10/00; G06Q 20/00; G06Q 30/00; G06Q 40/00
  USPC ..................................... 705/3–44
  See application file for complete search history.

(56) References Cited

U.S. PATENT DOCUMENTS

| | | |
|---|---|---|
| 3,316,395 A | 4/1967 | Lavin et al. |
| 3,405,457 A | 10/1968 | Bitzer |
| 4,346,442 A | 8/1982 | Musmanno |
| 4,734,858 A | 3/1988 | Schlafly |
| 4,736,294 A | 4/1988 | Gill |
| 4,755,940 A | 7/1988 | Brachtl et al. |
| 4,774,664 A | 9/1988 | Campbell et al. |
| 4,876,592 A | 10/1989 | Von Kohorn |
| 4,891,503 A | 1/1990 | Jewell |
| 4,895,518 A | 1/1990 | Arnold |
| 4,977,595 A | 12/1990 | Ohta et al. |
| 4,989,141 A | 1/1991 | Lyons et al. |
| 5,034,807 A | 7/1991 | Von Kohorn |

(Continued)

FOREIGN PATENT DOCUMENTS

| | | |
|---|---|---|
| EP | 0 542 298 | 5/1993 |
| EP | 0 869 652 | 10/1998 |

(Continued)

OTHER PUBLICATIONS

Avery et al., "Consumer Credit Scoring: Do Situational Circumstances Matter?" Journal of Banking & Finance, vol. 28, 2004, pp. 835-856.

(Continued)

*Primary Examiner* — Frantzy Poinvil
(74) *Attorney, Agent, or Firm* — Knobbe, Martens, Olson & Bear, LLP

(57) ABSTRACT

Methods and systems are disclosed that identify and locate debt settlement candidates based on credit data associated with the consumer. For example, candidacy may be based on a debt score, generated by an assessment of the consumer's credit data. Credit data may include the consumer's credit score rank, credit score, revolving credit to debit ratio, credit available, delinquent accounts, negative accounts, instances of negative information on their credit report, public record data, average account age, debit, or a combination thereof.

22 Claims, 9 Drawing Sheets

(56) References Cited

U.S. PATENT DOCUMENTS

| | | |
|---|---|---|
| 5,126,936 A | 6/1992 | Champion et al. |
| 5,148,365 A | 9/1992 | Dembo |
| 5,220,501 A | 6/1993 | Lawlor et al. |
| 5,259,766 A | 11/1993 | Sack |
| 5,262,941 A | 11/1993 | Saladin |
| 5,274,547 A | 12/1993 | Zoffel et al. |
| 5,336,870 A | 8/1994 | Hughes et al. |
| 5,383,113 A | 1/1995 | Kight et al. |
| 5,404,518 A | 4/1995 | Gilbertson et al. |
| 5,500,513 A | 3/1996 | Langhans et al. |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,640,577 A | 6/1997 | Scharmer |
| 5,659,725 A | 8/1997 | Levy et al. |
| 5,659,731 A | 8/1997 | Gustafson |
| 5,692,107 A | 11/1997 | Simoudis et al. |
| 5,704,029 A | 12/1997 | Wright, Jr. |
| 5,719,941 A | 2/1998 | Swift et al. |
| 5,732,400 A | 3/1998 | Mandler |
| 5,739,512 A | 4/1998 | Tognazzini |
| 5,748,098 A | 5/1998 | Grace |
| 5,754,632 A | 5/1998 | Smith |
| 5,774,883 A | 6/1998 | Andersen |
| 5,793,972 A | 8/1998 | Shane |
| 5,819,234 A | 10/1998 | Slavin et al. |
| 5,822,751 A | 10/1998 | Gray et al. |
| 5,825,884 A | 10/1998 | Zdepski et al. |
| 5,832,068 A | 11/1998 | Smith |
| 5,842,211 A | 11/1998 | Horadan et al. |
| 5,844,218 A | 12/1998 | Kawan et al. |
| 5,875,236 A | 2/1999 | Jankowitz |
| 5,878,403 A | 3/1999 | DeFrancesco |
| 5,881,131 A | 3/1999 | Farris et al. |
| 5,884,302 A | 3/1999 | Ho |
| 5,903,830 A | 5/1999 | Joao et al. |
| 5,903,881 A | 5/1999 | Schrader et al. |
| 5,930,764 A | 7/1999 | Melchione et al. |
| 5,930,776 A | 7/1999 | Dykstra et al. |
| 5,940,812 A | 8/1999 | Tengel et al. |
| 5,950,172 A | 9/1999 | Klingman |
| 5,956,693 A | 9/1999 | Geerlings |
| 5,963,939 A | 10/1999 | McCann et al. |
| 5,966,695 A | 10/1999 | Melchione et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,415 A | 12/1999 | Shurling et al. |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,038,551 A | 3/2000 | Barlow et al. |
| 6,064,987 A | 5/2000 | Walker |
| 6,064,990 A | 5/2000 | Goldsmith |
| 6,070,141 A | 5/2000 | Houvener |
| 6,070,147 A | 5/2000 | Harms et al. |
| 6,072,894 A | 6/2000 | Payne |
| 6,073,140 A | 6/2000 | Morgan et al. |
| 6,085,242 A | 7/2000 | Chandra |
| 6,088,686 A | 7/2000 | Walker et al. |
| 6,094,643 A | 7/2000 | Anderson et al. |
| 6,105,007 A | 8/2000 | Norris |
| 6,115,690 A | 9/2000 | Wong |
| 6,119,103 A | 9/2000 | Basch et al. |
| 6,128,599 A | 10/2000 | Walker |
| 6,128,602 A | 10/2000 | Northington et al. |
| 6,128,603 A | 10/2000 | Dent |
| 6,149,441 A | 11/2000 | Pellegrino et al. |
| 6,157,707 A | 12/2000 | Baulier et al. |
| 6,157,927 A | 12/2000 | Schaefer et al. |
| 6,161,139 A | 12/2000 | Win et al. |
| 6,178,420 B1 | 1/2001 | Sassano |
| 6,182,068 B1 | 1/2001 | Culliss |
| 6,182,229 B1 | 1/2001 | Nielsen |
| 6,202,053 B1 | 3/2001 | Christiansen et al. |
| 6,233,566 B1 | 5/2001 | Levine et al. |
| 6,247,000 B1 | 6/2001 | Hawkins et al. |
| 6,249,770 B1 | 6/2001 | Erwin et al. |
| 6,254,000 B1 | 7/2001 | Degen et al. |
| 6,263,447 B1 | 7/2001 | French et al. |
| 6,282,658 B2 | 8/2001 | French et al. |
| 6,304,860 B1 | 10/2001 | Martin et al. |
| 6,311,169 B2 | 10/2001 | Duhon |
| 6,321,339 B1 | 11/2001 | French et al. |
| 6,324,524 B1 | 11/2001 | Lent et al. |
| 6,327,578 B1 | 12/2001 | Linehan |
| 6,330,551 B1 | 12/2001 | Burchetta et al. |
| 6,330,575 B1 | 12/2001 | Moore |
| 6,343,279 B1 | 1/2002 | Bissonette et al. |
| 6,353,778 B1 | 3/2002 | Brown |
| 6,356,937 B1 | 3/2002 | Montville et al. |
| 6,384,844 B1 | 5/2002 | Stewart et al. |
| 6,386,444 B1 | 5/2002 | Sullivan |
| 6,397,197 B1 | 5/2002 | Gindlesperger |
| 6,397,212 B1 | 5/2002 | Biffar |
| 6,405,173 B1 | 6/2002 | Honarvar |
| 6,405,181 B2 | 6/2002 | Lent et al. |
| 6,421,675 B1 | 7/2002 | Ryan et al. |
| 6,421,729 B1 | 7/2002 | Paltenghe et al. |
| 6,422,462 B1 | 7/2002 | Cohen |
| 6,446,200 B1 | 9/2002 | Ball et al. |
| 6,453,353 B1 | 9/2002 | Win et al. |
| 6,457,012 B1 | 9/2002 | Jatkowski |
| 6,496,936 B1 | 12/2002 | French et al. |
| 6,523,021 B1 | 2/2003 | Monberg et al. |
| 6,523,022 B1 | 2/2003 | Hobbs |
| 6,523,041 B1 | 2/2003 | Morgan et al. |
| 6,539,377 B1 | 3/2003 | Culliss |
| 6,539,392 B1 | 3/2003 | Rebane |
| 6,543,683 B2 | 4/2003 | Hoffman |
| 6,564,210 B1 | 5/2003 | Korda et al. |
| 6,567,791 B2 | 5/2003 | Lent et al. |
| 6,571,236 B1 | 5/2003 | Ruppelt |
| 6,574,736 B1 | 6/2003 | Andrews |
| 6,581,025 B2 | 6/2003 | Lehman |
| 6,587,841 B1 | 7/2003 | DeFrancesco |
| 6,615,193 B1 | 9/2003 | Kingdon et al. |
| 6,622,131 B1 | 9/2003 | Brown et al. |
| 6,629,245 B1 | 9/2003 | Stone et al. |
| 6,647,383 B1 | 11/2003 | August et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,703,930 B2 | 3/2004 | Skinner |
| 6,714,944 B1 | 3/2004 | Shapiro et al. |
| 6,725,381 B1 | 4/2004 | Smith et al. |
| 6,745,938 B2 | 6/2004 | Sullivan |
| 6,748,426 B1 | 6/2004 | Shaffer et al. |
| 6,750,985 B2 | 6/2004 | Rhoads |
| 6,766,327 B2 | 7/2004 | Morgan, Jr. et al. |
| 6,781,608 B1 | 8/2004 | Crawford |
| 6,782,379 B2 | 8/2004 | Lee |
| 6,792,088 B2 | 9/2004 | Takeuchi |
| 6,792,263 B1 | 9/2004 | Kite |
| 6,796,497 B2 | 9/2004 | Benkert et al. |
| 6,804,346 B1 | 10/2004 | Mewhinney |
| 6,805,287 B2 | 10/2004 | Bishop et al. |
| 6,816,850 B2 | 11/2004 | Culliss |
| 6,845,448 B1 | 1/2005 | Chaganti et al. |
| 6,857,073 B2 | 2/2005 | French et al. |
| 6,871,287 B1 | 3/2005 | Ellingson |
| 6,892,307 B1 | 5/2005 | Wood et al. |
| 6,900,731 B2 | 5/2005 | Kreiner et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,941,323 B1 | 9/2005 | Galperin |
| 6,947,989 B2 | 9/2005 | Gullotta et al. |
| 6,950,807 B2 | 9/2005 | Brock |
| 6,954,757 B2 | 10/2005 | Zargham et al. |
| 6,962,336 B2 | 11/2005 | Glass |

(56) References Cited

U.S. PATENT DOCUMENTS

| | | |
|---|---|---|
| 6,965,881 B1 | 11/2005 | Brickell et al. |
| 6,968,319 B1 | 11/2005 | Remington et al. |
| 6,973,462 B2 | 12/2005 | Dattero et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,988,085 B2 | 1/2006 | Hedy |
| 6,999,941 B1 | 2/2006 | Agarwal |
| 7,013,315 B1 | 3/2006 | Boothby |
| 7,016,907 B2 | 3/2006 | Boreham et al. |
| 7,028,001 B1 | 4/2006 | Muthuswamy et al. |
| 7,028,013 B2 | 4/2006 | Saeki |
| 7,028,052 B2 | 4/2006 | Chapman et al. |
| 7,035,855 B1 | 4/2006 | Kilger et al. |
| 7,039,607 B2 | 5/2006 | Watarai et al. |
| 7,043,476 B2 | 5/2006 | Robson |
| 7,046,139 B2 | 5/2006 | Kuhn et al. |
| 7,047,251 B2 | 5/2006 | Reed et al. |
| 7,050,989 B1 | 5/2006 | Hurt et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,069,240 B2 | 6/2006 | Spero et al. |
| 7,072,909 B2 | 7/2006 | Polk |
| 7,076,462 B1 | 7/2006 | Nelson et al. |
| 7,076,475 B2 | 7/2006 | Honarvar |
| 7,085,727 B2 | 8/2006 | VanOrman |
| 7,089,594 B2 | 8/2006 | Lal et al. |
| 7,107,241 B1 | 9/2006 | Pinto |
| 7,117,172 B1 | 10/2006 | Black |
| 7,124,144 B2 | 10/2006 | Christianson et al. |
| 7,133,935 B2 | 11/2006 | Hedy |
| 7,143,063 B2 | 11/2006 | Lent |
| 7,155,739 B2 | 12/2006 | Bari et al. |
| 7,181,418 B1 | 2/2007 | Zucker et al. |
| 7,181,427 B1 | 2/2007 | DeFrancesco |
| 7,184,974 B2 | 2/2007 | Shishido |
| 7,185,016 B1 | 2/2007 | Rasmussen |
| 7,194,416 B1 | 3/2007 | Provost et al. |
| 7,200,602 B2 | 4/2007 | Jonas |
| 7,209,895 B2 | 4/2007 | Kundtz et al. |
| 7,209,911 B2 | 4/2007 | Boothby et al. |
| 7,212,995 B2 | 5/2007 | Schulkins |
| 7,218,912 B2 | 5/2007 | Erskine et al. |
| 7,219,107 B2 | 5/2007 | Beringer |
| 7,222,369 B2 | 5/2007 | Vering et al. |
| 7,234,156 B2 | 6/2007 | French et al. |
| 7,236,950 B2 | 6/2007 | Savage et al. |
| 7,243,369 B2 | 7/2007 | Bhat et al. |
| 7,246,740 B2 | 7/2007 | Swift et al. |
| 7,249,048 B1 | 7/2007 | O'Flaherty |
| 7,249,076 B1 | 7/2007 | Pendleton et al. |
| 7,249,113 B1 | 7/2007 | Continelli et al. |
| 7,263,497 B1 | 8/2007 | Wiser et al. |
| 7,272,591 B1 | 9/2007 | Ghazal et al. |
| 7,280,980 B1 | 10/2007 | Hoadley et al. |
| 7,281,652 B2 | 10/2007 | Foss |
| 7,289,971 B1 | 10/2007 | O'Neil et al. |
| 7,296,734 B2 | 11/2007 | Pliha |
| 7,302,272 B2 | 11/2007 | Ackley |
| 7,310,611 B2 | 12/2007 | Shibuya et al. |
| 7,310,617 B1 | 12/2007 | Cunningham |
| 7,310,618 B2 * | 12/2007 | Libman ............ G06Q 40/025 705/38 |
| 7,314,167 B1 | 1/2008 | Kiliccote |
| 7,315,837 B2 | 1/2008 | Sloan et al. |
| 7,328,233 B2 | 2/2008 | Salim et al. |
| 7,330,717 B2 | 2/2008 | Gidron et al. |
| 7,330,835 B2 | 2/2008 | Deggendorf |
| 7,333,635 B2 | 2/2008 | Tsantes et al. |
| 7,337,133 B1 | 2/2008 | Bezos et al. |
| 7,337,468 B2 | 2/2008 | Metzger |
| 7,340,679 B2 | 3/2008 | Botscheck et al. |
| 7,343,149 B2 | 3/2008 | Benco |
| 7,343,295 B2 | 3/2008 | Pomerance |
| 7,356,516 B2 | 4/2008 | Richey et al. |
| 7,366,694 B2 | 4/2008 | Lazerson |
| 7,370,044 B2 | 5/2008 | Mulhern et al. |
| 7,373,324 B1 | 5/2008 | Engin et al. |
| 7,383,988 B2 | 6/2008 | Slonecker, Jr. |
| 7,386,511 B2 | 6/2008 | Buchanan et al. |
| 7,389,913 B2 | 6/2008 | Starrs |
| 7,395,273 B2 | 7/2008 | Khan et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,421,322 B1 | 9/2008 | Silversmith et al. |
| 7,433,864 B2 | 10/2008 | Malik |
| 7,437,679 B2 | 10/2008 | Uemura et al. |
| 7,444,518 B1 | 10/2008 | Dharmarajan et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,475,032 B1 | 1/2009 | Patnode et al. |
| 7,479,949 B2 | 1/2009 | Jobs et al. |
| 7,480,631 B1 | 1/2009 | Merced et al. |
| 7,490,356 B2 | 2/2009 | Lieblich et al. |
| 7,503,489 B2 | 3/2009 | Heffez |
| 7,505,939 B2 | 3/2009 | Lent et al. |
| 7,509,117 B2 | 3/2009 | Yum |
| 7,509,278 B2 | 3/2009 | Jones |
| 7,512,221 B2 | 3/2009 | Toms |
| 7,529,698 B2 | 5/2009 | Joao |
| 7,530,097 B2 | 5/2009 | Casco-Arias et al. |
| 7,533,179 B2 | 5/2009 | Tarquini et al. |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,559,217 B2 | 7/2009 | Bass |
| 7,562,184 B2 | 7/2009 | Henmi et al. |
| 7,562,814 B2 | 7/2009 | Shao et al. |
| 7,571,138 B2 | 8/2009 | Miri et al. |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,126 B1 | 9/2009 | White |
| 7,587,368 B2 | 9/2009 | Felsher |
| 7,593,891 B2 | 9/2009 | Kornegay et al. |
| 7,594,019 B2 | 9/2009 | Clapper |
| 7,596,512 B1 | 9/2009 | Raines et al. |
| 7,596,716 B2 | 9/2009 | Frost et al. |
| 7,610,216 B1 | 10/2009 | May et al. |
| 7,610,229 B1 | 10/2009 | Kornegay |
| 7,613,600 B2 | 11/2009 | Krane |
| 7,620,596 B2 | 11/2009 | Knudson et al. |
| 7,623,844 B2 | 11/2009 | Herrmann et al. |
| 7,630,903 B1 | 12/2009 | Vaidyanathan |
| 7,634,737 B2 | 12/2009 | Beringer et al. |
| 7,640,200 B2 | 12/2009 | Gardner et al. |
| 7,644,035 B1 | 1/2010 | Biffle et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,685,209 B1 | 3/2010 | Norton et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |

(56) References Cited

U.S. PATENT DOCUMENTS

| | | |
|---|---|---|
| 7,689,563 B1 | 3/2010 | Jacobson |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,711,636 B2 | 5/2010 | Robida et al. |
| 7,715,832 B2 | 5/2010 | Zhou |
| 7,720,846 B1 | 5/2010 | Bayliss |
| 7,725,385 B2 | 5/2010 | Royer et al. |
| 7,729,959 B1 | 6/2010 | Wells et al. |
| 7,730,078 B2 | 6/2010 | Schwabe et al. |
| 7,739,707 B2 | 6/2010 | Sie et al. |
| 7,747,520 B2 | 6/2010 | Livermore et al. |
| 7,747,521 B2 | 6/2010 | Serio |
| 7,747,559 B2 | 6/2010 | Leitner et al. |
| 7,752,236 B2 | 7/2010 | Williams et al. |
| 7,756,789 B2 | 7/2010 | Welker et al. |
| 7,761,373 B2 | 7/2010 | Metz |
| 7,761,384 B2 | 7/2010 | Madhogarhia |
| 7,765,148 B2 | 7/2010 | German et al. |
| 7,765,166 B2 | 7/2010 | Beringer et al. |
| 7,769,697 B2 | 8/2010 | Fieschi et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,787,869 B2 | 8/2010 | Rice et al. |
| 7,788,040 B2 | 8/2010 | Haskell et al. |
| 7,788,147 B2 | 8/2010 | Haggerty et al. |
| 7,792,715 B1 | 9/2010 | Kasower |
| 7,792,725 B2 | 9/2010 | Booraem et al. |
| 7,792,903 B2 | 9/2010 | Fischer et al. |
| 7,793,835 B1 | 9/2010 | Coggeshall et al. |
| 7,797,252 B2 | 9/2010 | Rosskamm et al. |
| 7,801,807 B2 | 9/2010 | DeFrancesco et al. |
| 7,801,811 B1 | 9/2010 | Merrell et al. |
| 7,801,956 B1 | 9/2010 | Cumberbatch et al. |
| 7,802,104 B2 | 9/2010 | Dickinson |
| 7,805,362 B1 | 9/2010 | Merrell et al. |
| 7,809,398 B2 | 10/2010 | Pearson |
| 7,809,797 B2 | 10/2010 | Cooley et al. |
| 7,810,036 B2 | 10/2010 | Bales et al. |
| 7,814,002 B2 | 10/2010 | DeFrancesco et al. |
| 7,814,005 B2 | 10/2010 | Imrey et al. |
| 7,818,228 B1 | 10/2010 | Coulter |
| 7,818,229 B2* | 10/2010 | Imrey et al. ............. 705/35 |
| 7,827,115 B2 | 11/2010 | Weller et al. |
| 7,832,006 B2 | 11/2010 | Chen et al. |
| 7,840,484 B2 | 11/2010 | Haggerty et al. |
| 7,841,004 B1 | 11/2010 | Balducci et al. |
| 7,841,008 B1 | 11/2010 | Cole et al. |
| 7,844,520 B1 | 11/2010 | Franklin |
| 7,844,604 B2 | 11/2010 | Baio et al. |
| 7,848,972 B1 | 12/2010 | Sharma |
| 7,848,978 B2 | 12/2010 | Imrey et al. |
| 7,849,014 B2 | 12/2010 | Erikson |
| 7,853,493 B2 | 12/2010 | DeBie et al. |
| 7,853,518 B2 | 12/2010 | Cagan |
| 7,856,203 B2 | 12/2010 | Lipovski |
| 7,856,386 B2 | 12/2010 | Hazlehurst et al. |
| 7,870,066 B2 | 1/2011 | Lin et al. |
| 7,870,078 B2 | 1/2011 | Clark et al. |
| 7,877,304 B1* | 1/2011 | Coulter ................. G06Q 40/00 705/35 |
| 7,877,784 B2 | 1/2011 | Chow et al. |
| 7,890,403 B1 | 2/2011 | Smith |
| 7,890,420 B2 | 2/2011 | Haggerty et al. |
| 7,899,750 B1 | 3/2011 | Klieman et al. |
| 7,904,306 B2 | 3/2011 | Johnson et al. |
| 7,908,242 B1 | 3/2011 | Achanta |
| 7,909,246 B2 | 3/2011 | Hogg et al. |
| 7,912,842 B1 | 3/2011 | Bayliss et al. |
| 7,912,865 B2 | 3/2011 | Akerman et al. |
| 7,925,582 B1 | 4/2011 | Kornegay et al. |
| 7,925,982 B2 | 4/2011 | Parker |
| 7,954,698 B1 | 6/2011 | Pliha |
| 7,958,046 B2 | 6/2011 | Doerner et al. |
| 7,966,192 B2 | 6/2011 | Pagliari et al. |
| 7,970,676 B2 | 6/2011 | Feinstein |
| 7,970,679 B2 | 6/2011 | Kasower |
| 7,975,299 B1 | 7/2011 | Balducci et al. |
| 7,979,908 B2 | 7/2011 | Millwee |
| 7,983,932 B2 | 7/2011 | Kane |
| 7,987,501 B2 | 7/2011 | Miller et al. |
| 7,991,901 B2 | 8/2011 | Tarquini et al. |
| 7,996,912 B2 | 8/2011 | Spalink et al. |
| 8,001,153 B2 | 8/2011 | Skurtovich, Jr. et al. |
| 8,001,235 B2 | 8/2011 | Russ et al. |
| 8,005,759 B2 | 8/2011 | Hirtenstein et al. |
| 8,015,107 B2 | 9/2011 | Kornegay et al. |
| 8,032,932 B2 | 10/2011 | Speyer et al. |
| 8,037,097 B2 | 10/2011 | Guo et al. |
| 8,055,904 B1 | 11/2011 | Cato et al. |
| 8,060,424 B2 | 11/2011 | Kasower |
| 8,060,916 B2 | 11/2011 | Bajaj et al. |
| 8,065,233 B2 | 11/2011 | Lee et al. |
| 8,073,768 B2 | 12/2011 | Haggerty et al. |
| 8,078,453 B2 | 12/2011 | Shaw |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,086,523 B1 | 12/2011 | Palmer |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,104,679 B2 | 1/2012 | Brown |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,131,777 B2 | 3/2012 | McCullough |
| 8,160,960 B1 | 4/2012 | Fei et al. |
| 8,175,889 B1 | 5/2012 | Girulat et al. |
| 8,195,549 B2 | 6/2012 | Kasower |
| 8,201,257 B1 | 6/2012 | Andres et al. |
| 8,204,812 B2 | 6/2012 | Stewart et al. |
| 8,224,723 B2 | 7/2012 | Bosch et al. |
| 8,234,498 B2 | 7/2012 | Britti et al. |
| 8,244,848 B1 | 8/2012 | Narayanan et al. |
| 8,249,968 B1 | 8/2012 | Oldham et al. |
| 8,271,393 B2 | 9/2012 | Twining et al. |
| 8,280,805 B1 | 10/2012 | Abrahams et al. |
| 8,281,372 B1 | 10/2012 | Vidal |
| 8,285,613 B1 | 10/2012 | Coulter |
| 8,285,656 B1 | 10/2012 | Chang et al. |
| 8,290,840 B2 | 10/2012 | Kasower |
| 8,290,856 B1 | 10/2012 | Kasower |
| 8,296,229 B1 | 10/2012 | Yellin et al. |
| 8,312,033 B1 | 11/2012 | McMillan |
| 8,321,334 B1 | 11/2012 | Kornegay et al. |
| 8,321,339 B2* | 11/2012 | Imrey et al. ............. 705/39 |
| 8,321,952 B2 | 11/2012 | Spalink et al. |
| 8,327,429 B2 | 12/2012 | Speyer et al. |
| 8,335,741 B2 | 12/2012 | Kornegay et al. |
| 8,355,967 B2 | 1/2013 | Debie et al. |
| 8,364,588 B2 | 1/2013 | Celka et al. |
| 8,374,973 B2 | 2/2013 | Herbrich et al. |
| 8,392,334 B2 | 3/2013 | Hirtenstein et al. |
| 8,412,593 B1 | 4/2013 | Song et al. |
| 8,433,654 B2 | 4/2013 | Subbarao et al. |
| 8,456,293 B1 | 6/2013 | Trundle et al. |
| 8,463,919 B2 | 6/2013 | Tarquini et al. |
| 8,464,939 B1 | 6/2013 | Taylor et al. |
| 8,473,318 B2 | 6/2013 | Nielson et al. |
| 8,478,674 B1 | 7/2013 | Kapczynski et al. |
| 8,484,186 B1 | 7/2013 | Kapczynski et al. |
| 8,515,828 B1 | 8/2013 | Wolf et al. |
| 8,515,844 B2 | 8/2013 | Kasower |
| 8,527,357 B1 | 9/2013 | Ganesan |
| 8,533,118 B2 | 9/2013 | Weller et al. |

(56) References Cited

U.S. PATENT DOCUMENTS

| | | | |
|---|---|---|---|
| 8,560,436 B2* | 10/2013 | Ingram et al. ............... 705/38 |
| 8,560,447 B1 | 10/2013 | Hinghole et al. |
| 8,572,083 B1 | 10/2013 | Snell et al. |
| 8,578,036 B1 | 11/2013 | Holfelder et al. |
| 8,578,496 B1 | 11/2013 | Krishnappa |
| 8,589,286 B1 | 11/2013 | Kornegay et al. |
| 8,600,886 B2 | 12/2013 | Ramavarjula et al. |
| 8,601,602 B1 | 12/2013 | Zheng |
| 8,606,694 B2 | 12/2013 | Campbell et al. |
| 8,630,938 B2 | 1/2014 | Cheng et al. |
| 8,639,920 B2 | 1/2014 | Stack et al. |
| 8,646,051 B2 | 2/2014 | Paden et al. |
| 8,705,718 B2 | 4/2014 | Baniak et al. |
| 8,706,599 B1 | 4/2014 | Koenig et al. |
| 8,725,613 B1 | 5/2014 | Celka et al. |
| 8,738,516 B1 | 5/2014 | Dean et al. |
| 8,768,914 B2 | 7/2014 | Scriffignano et al. |
| 8,781,951 B2* | 7/2014 | Lewis ............... G06Q 40/025 705/35 |
| 8,781,953 B2 | 7/2014 | Kasower |
| 8,782,217 B1 | 7/2014 | Arone et al. |
| 8,818,888 B1 | 8/2014 | Kapczynski et al. |
| 8,856,894 B1 | 10/2014 | Dean et al. |
| 8,930,251 B2 | 1/2015 | DeBie |
| 8,930,263 B1 | 1/2015 | Mahacek et al. |
| 8,949,981 B1 | 2/2015 | Trollope et al. |
| 8,954,459 B1 | 2/2015 | McMillan et al. |
| 8,966,649 B2 | 2/2015 | Stack et al. |
| 8,972,400 B1 | 3/2015 | Kapczynski et al. |
| 9,058,627 B1 | 6/2015 | Wasser et al. |
| 9,106,691 B1 | 8/2015 | Burger et al. |
| 9,147,042 B1 | 9/2015 | Haller et al. |
| 9,230,283 B1 | 1/2016 | Taylor et al. |
| 9,256,904 B1 | 2/2016 | Haller et al. |
| 2001/0011245 A1 | 8/2001 | Duhon |
| 2001/0029470 A1 | 10/2001 | Schultz et al. |
| 2001/0029482 A1 | 10/2001 | Tealdi et al. |
| 2001/0037204 A1 | 11/2001 | Horn et al. |
| 2001/0037289 A1 | 11/2001 | Mayr et al. |
| 2001/0039523 A1 | 11/2001 | Iwamoto |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0047332 A1 | 11/2001 | Gonen-Friedman et al. |
| 2001/0049274 A1 | 12/2001 | Degraeve |
| 2001/0049672 A1 | 12/2001 | Moore et al. |
| 2002/0010616 A1 | 1/2002 | Itzaki |
| 2002/0013827 A1 | 1/2002 | Edstrom et al. |
| 2002/0013899 A1 | 1/2002 | Faul |
| 2002/0026394 A1 | 2/2002 | Savage et al. |
| 2002/0026507 A1 | 2/2002 | Sears et al. |
| 2002/0029192 A1 | 3/2002 | Nakagawa et al. |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0033846 A1 | 3/2002 | Balasubramanian et al. |
| 2002/0035480 A1 | 3/2002 | Gordon et al. |
| 2002/0035511 A1 | 3/2002 | Haji et al. |
| 2002/0045154 A1 | 4/2002 | Wood et al. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0069122 A1 | 6/2002 | Yun et al. |
| 2002/0069182 A1 | 6/2002 | Dwyer |
| 2002/0072927 A1 | 6/2002 | Phelan et al. |
| 2002/0077964 A1 | 6/2002 | Brody et al. |
| 2002/0087460 A1 | 7/2002 | Hornung |
| 2002/0099628 A1 | 7/2002 | Yakaoka et al. |
| 2002/0099635 A1 | 7/2002 | Guiragosian |
| 2002/0099824 A1 | 7/2002 | Bender et al. |
| 2002/0103809 A1 | 8/2002 | Starzl et al. |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0120757 A1 | 8/2002 | Sutherland et al. |
| 2002/0120846 A1 | 8/2002 | Stewart et al. |
| 2002/0128962 A1 | 9/2002 | Kasower |
| 2002/0133365 A1 | 9/2002 | Grey et al. |
| 2002/0133462 A1 | 9/2002 | Shteyn |
| 2002/0133504 A1 | 9/2002 | Vlahos et al. |
| 2002/0138409 A1 | 9/2002 | Bass |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0188544 A1 | 12/2002 | Wizon et al. |
| 2002/0194120 A1 | 12/2002 | Russell et al. |
| 2002/0198800 A1 | 12/2002 | Shamrakov |
| 2002/0198806 A1 | 12/2002 | Blagg et al. |
| 2002/0198824 A1 | 12/2002 | Cook |
| 2002/0198830 A1 | 12/2002 | Randell et al. |
| 2003/0002671 A1 | 1/2003 | Inchalik et al. |
| 2003/0007283 A1 | 1/2003 | Ostwald et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0018578 A1 | 1/2003 | Schultz |
| 2003/0023531 A1 | 1/2003 | Fergusson |
| 2003/0028466 A1 | 2/2003 | Jenson et al. |
| 2003/0028477 A1 | 2/2003 | Stevenson et al. |
| 2003/0046311 A1 | 3/2003 | Baidya et al. |
| 2003/0050929 A1 | 3/2003 | Bookman et al. |
| 2003/0061104 A1 | 3/2003 | Thomson et al. |
| 2003/0061163 A1 | 3/2003 | Durfield |
| 2003/0065563 A1 | 4/2003 | Elliott et al. |
| 2003/0069839 A1 | 4/2003 | Whittington et al. |
| 2003/0069943 A1 | 4/2003 | Bahrs et al. |
| 2003/0097342 A1 | 5/2003 | Whittingtom |
| 2003/0097380 A1 | 5/2003 | Mulhern et al. |
| 2003/0101344 A1 | 5/2003 | Wheeler et al. |
| 2003/0105646 A1 | 6/2003 | Siepser |
| 2003/0105710 A1 | 6/2003 | Barbara et al. |
| 2003/0105728 A1 | 6/2003 | Yano et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0149659 A1 | 8/2003 | Danaher et al. |
| 2003/0154162 A1 | 8/2003 | Danaher et al. |
| 2003/0158960 A1 | 8/2003 | Engberg |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0187768 A1 | 10/2003 | Ryan et al. |
| 2003/0187837 A1 | 10/2003 | Culliss |
| 2003/0195859 A1 | 10/2003 | Lawrence |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212654 A1 | 11/2003 | Harper et al. |
| 2003/0220858 A1 | 11/2003 | Lam et al. |
| 2003/0225742 A1 | 12/2003 | Tenner et al. |
| 2003/0229580 A1 | 12/2003 | Gass et al. |
| 2003/0229892 A1 | 12/2003 | Sardera |
| 2004/0001565 A1 | 1/2004 | Jones et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024709 A1 | 2/2004 | Yu et al. |
| 2004/0030574 A1 | 2/2004 | DiCostanzo et al. |
| 2004/0030621 A1 | 2/2004 | Cobb |

(56) References Cited

U.S. PATENT DOCUMENTS

| | | |
|---|---|---|
| 2004/0030629 A1 | 2/2004 | Freeman et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0046033 A1 | 3/2004 | Kolodziej et al. |
| 2004/0062213 A1 | 4/2004 | Koss |
| 2004/0083159 A1 | 4/2004 | Crosby et al. |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |
| 2004/0098625 A1 | 5/2004 | Lagadec et al. |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111292 A1 | 6/2004 | Hutchins |
| 2004/0111359 A1 | 6/2004 | Hudock |
| 2004/0117302 A1 | 6/2004 | Weichert et al. |
| 2004/0117358 A1 | 6/2004 | Von Kaenel et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0128230 A1 | 7/2004 | Oppenheimer et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138995 A1 | 7/2004 | Hershkowitz et al. |
| 2004/0138997 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153330 A1 | 8/2004 | Miller et al. |
| 2004/0158521 A1 | 8/2004 | Newton |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0199456 A1 | 10/2004 | Flint et al. |
| 2004/0199789 A1 | 10/2004 | Shaw et al. |
| 2004/0210661 A1 | 10/2004 | Thompson |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225594 A1 | 11/2004 | Nolan, III et al. |
| 2004/0225609 A1 | 11/2004 | Greene |
| 2004/0225643 A1 | 11/2004 | Alpha et al. |
| 2004/0230527 A1 | 11/2004 | Hansen et al. |
| 2004/0230534 A1 | 11/2004 | McGough |
| 2004/0236688 A1 | 11/2004 | Bozeman |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0004855 A1 | 1/2005 | Jenson et al. |
| 2005/0010513 A1 | 1/2005 | Duckworth et al. |
| 2005/0010555 A1 | 1/2005 | Gallivan |
| 2005/0015273 A1 | 1/2005 | Iyer |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027983 A1 | 2/2005 | Klawon |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0080723 A1 | 4/2005 | Burchetta et al. |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Hada |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0171884 A1 | 8/2005 | Arnott |
| 2005/0192008 A1 | 9/2005 | Desai et al. |
| 2005/0203768 A1 | 9/2005 | Florance |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0251474 A1 | 11/2005 | Shinn et al. |
| 2005/0267840 A1 | 12/2005 | Holm-Blagg et al. |
| 2005/0273431 A1 | 12/2005 | Abel et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0020611 A1 | 1/2006 | Gilbert et al. |
| 2006/0031158 A1 | 2/2006 | Orman |
| 2006/0031177 A1 | 2/2006 | Rule |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041670 A1 | 2/2006 | Musseleck et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136595 A1 | 6/2006 | Satyavolu |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |

(56) References Cited

U.S. PATENT DOCUMENTS

| | | |
|---|---|---|
| 2006/0190394 A1 | 8/2006 | Fraser et al. |
| 2006/0195351 A1 | 8/2006 | Bayburtian |
| 2006/0200583 A1 | 9/2006 | Le Lann et al. |
| 2006/0202012 A1 | 9/2006 | Grano et al. |
| 2006/0212386 A1 | 9/2006 | Willey et al. |
| 2006/0212407 A1 | 9/2006 | Lyon |
| 2006/0218407 A1 | 9/2006 | Toms |
| 2006/0223043 A1 | 10/2006 | Dancy-Edwards et al. |
| 2006/0229943 A1 | 10/2006 | Mathias et al. |
| 2006/0229961 A1 | 10/2006 | Lyftogt et al. |
| 2006/0233332 A1 | 10/2006 | Toms |
| 2006/0235935 A1 | 10/2006 | Ng |
| 2006/0239512 A1 | 10/2006 | Petrillo |
| 2006/0242047 A1 | 10/2006 | Haggerty et al. |
| 2006/0253358 A1 | 11/2006 | Delgrosso et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277092 A1 | 12/2006 | Williams |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0016500 A1 | 1/2007 | Chatterji et al. |
| 2007/0016501 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0055621 A1 | 3/2007 | Tischler et al. |
| 2007/0067206 A1 | 3/2007 | Haggerty et al. |
| 2007/0067297 A1 | 3/2007 | Kublickis |
| 2007/0067437 A1 | 3/2007 | Sindambiwe |
| 2007/0072190 A1 | 3/2007 | Aggarwal |
| 2007/0073577 A1 | 3/2007 | Krause |
| 2007/0073889 A1 | 3/2007 | Morris |
| 2007/0078741 A1 | 4/2007 | Haggerty et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094230 A1 | 4/2007 | Subramaniam et al. |
| 2007/0094241 A1 | 4/2007 | Blackwell et al. |
| 2007/0100719 A1 | 5/2007 | Chwast et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0118393 A1 | 5/2007 | Rosen et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0136109 A1 | 6/2007 | Yager et al. |
| 2007/0143123 A1 | 6/2007 | Goldberg et al. |
| 2007/0156554 A1 | 7/2007 | Nikoley et al. |
| 2007/0156576 A1* | 7/2007 | Imrey et al. .......... 705/38 |
| 2007/0156581 A1 | 7/2007 | Imrey et al. |
| 2007/0156692 A1 | 7/2007 | Rosewarne |
| 2007/0160458 A1 | 7/2007 | Yen |
| 2007/0174186 A1 | 7/2007 | Hokland |
| 2007/0174448 A1 | 7/2007 | Ahuja et al. |
| 2007/0174903 A1 | 7/2007 | Greff |
| 2007/0185797 A1 | 8/2007 | Robinson |
| 2007/0198432 A1 | 8/2007 | Pitroda et al. |
| 2007/0204338 A1 | 8/2007 | Aiello et al. |
| 2007/0205266 A1 | 9/2007 | Carr et al. |
| 2007/0208640 A1 | 9/2007 | Banasiak et al. |
| 2007/0220003 A1 | 9/2007 | Chern et al. |
| 2007/0220611 A1 | 9/2007 | Socolow et al. |
| 2007/0226047 A1 | 9/2007 | Ward |
| 2007/0226122 A1 | 9/2007 | Burrell et al. |
| 2007/0233591 A1 | 10/2007 | Newton |
| 2007/0239493 A1 | 10/2007 | Sweetland et al. |
| 2007/0240206 A1 | 10/2007 | Wu et al. |
| 2007/0244732 A1 | 10/2007 | Chatterji et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0260539 A1 | 11/2007 | Delinsky |
| 2007/0262140 A1 | 11/2007 | Long, Sr. |
| 2007/0266439 A1 | 11/2007 | Kraft |
| 2007/0273558 A1 | 11/2007 | Smith |
| 2007/0282730 A1 | 12/2007 | Carpenter et al. |
| 2007/0282736 A1 | 12/2007 | Conlin et al. |
| 2007/0282743 A1 | 12/2007 | Lovelett |
| 2007/0288338 A1 | 12/2007 | Hoadley |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0299759 A1 | 12/2007 | Kelly |
| 2007/0299770 A1 | 12/2007 | Delinsky |
| 2007/0299771 A1 | 12/2007 | Brody |
| 2008/0010203 A1 | 1/2008 | Grant |
| 2008/0010206 A1 | 1/2008 | Coleman |
| 2008/0010687 A1 | 1/2008 | Gonen et al. |
| 2008/0021802 A1 | 1/2008 | Pendleton |
| 2008/0027859 A1 | 1/2008 | Nathans et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040610 A1 | 2/2008 | Fergusson |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059224 A1 | 3/2008 | Schechter |
| 2008/0059352 A1 | 3/2008 | Chandran |
| 2008/0059364 A1 | 3/2008 | Tidwell et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0103800 A1 | 5/2008 | Domenikos et al. |
| 2008/0103972 A1 | 5/2008 | Lanc |
| 2008/0109422 A1 | 5/2008 | Dedhia |
| 2008/0109740 A1 | 5/2008 | Prinsen et al. |
| 2008/0110973 A1 | 5/2008 | Nathans et al. |
| 2008/0114670 A1 | 5/2008 | Friesen |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0133278 A1 | 6/2008 | Stanfield |
| 2008/0133322 A1 | 6/2008 | Kalia et al. |
| 2008/0140507 A1 | 6/2008 | Hamlisch et al. |
| 2008/0140576 A1 | 6/2008 | Lewis et al. |
| 2008/0141346 A1 | 6/2008 | Kay et al. |
| 2008/0148368 A1 | 6/2008 | Zurko et al. |
| 2008/0154758 A1 | 6/2008 | Schattmaier et al. |

(56) References Cited

U.S. PATENT DOCUMENTS

| | | |
|---|---|---|
| 2008/0154766 A1* | 6/2008 | Lewis ................ G06Q 40/025 705/38 |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0172324 A1 | 7/2008 | Johnson |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183504 A1 | 7/2008 | Highley |
| 2008/0183585 A1 | 7/2008 | Vianello |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208735 A1 | 8/2008 | Balet et al. |
| 2008/0212845 A1 | 9/2008 | Lund |
| 2008/0221972 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0249869 A1 | 10/2008 | Angell et al. |
| 2008/0255992 A1 | 10/2008 | Lin |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0301016 A1 | 12/2008 | Durvasula et al. |
| 2008/0319889 A1 | 12/2008 | Hammad |
| 2009/0006230 A1 | 1/2009 | Lyda et al. |
| 2009/0024484 A1 | 1/2009 | Walker et al. |
| 2009/0030776 A1 | 1/2009 | Walker et al. |
| 2009/0037332 A1 | 2/2009 | Cheung et al. |
| 2009/0043691 A1 | 2/2009 | Kasower |
| 2009/0048957 A1 | 2/2009 | Celano |
| 2009/0055322 A1 | 2/2009 | Bykov et al. |
| 2009/0055404 A1 | 2/2009 | Heiden et al. |
| 2009/0060343 A1 | 3/2009 | Rosca |
| 2009/0064297 A1 | 3/2009 | Selgas et al. |
| 2009/0089190 A1 | 4/2009 | Girulat |
| 2009/0089193 A1 | 4/2009 | Palantin |
| 2009/0094237 A1 | 4/2009 | Churi et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112650 A1 | 4/2009 | Iwane |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132347 A1 | 5/2009 | Anderson et al. |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0171723 A1 | 7/2009 | Jenkins |
| 2009/0172788 A1 | 7/2009 | Vedula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0198557 A1 | 8/2009 | Wang et al. |
| 2009/0198602 A1 | 8/2009 | Wang et al. |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240609 A1 | 9/2009 | Cho et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0289110 A1 | 11/2009 | Regen et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0307778 A1 | 12/2009 | Mardikar |
| 2009/0313562 A1 | 12/2009 | Appleyard et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0011428 A1 | 1/2010 | Atwood et al. |
| 2010/0023434 A1* | 1/2010 | Bond .............................. 705/35 |
| 2010/0023440 A1 | 1/2010 | Fraser et al. |
| 2010/0023448 A1 | 1/2010 | Eze |
| 2010/0030578 A1 | 2/2010 | Siddique et al. |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042542 A1 | 2/2010 | Rose et al. |
| 2010/0043055 A1 | 2/2010 | Baumgart |
| 2010/0049803 A1 | 2/2010 | Ogilvie et al. |
| 2010/0063942 A1 | 3/2010 | Arnott et al. |
| 2010/0063993 A1 | 3/2010 | Higgins et al. |
| 2010/0077483 A1 | 3/2010 | Stolfo et al. |
| 2010/0082476 A1 | 4/2010 | Bowman |
| 2010/0083371 A1 | 4/2010 | Bennetts et al. |
| 2010/0094758 A1 | 4/2010 | Chamberlain et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0223160 A1 | 9/2010 | Brown |
| 2010/0223168 A1 | 9/2010 | Haggerty et al. |
| 2010/0223192 A1 | 9/2010 | Levine et al. |

(56) References Cited

U.S. PATENT DOCUMENTS

| | | |
|---|---|---|
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257577 A1 | 10/2010 | Grandison et al. |
| 2010/0258623 A1 | 10/2010 | Beemer et al. |
| 2010/0262932 A1 | 10/2010 | Pan |
| 2010/0268557 A1 | 10/2010 | Faith et al. |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0299251 A1 | 11/2010 | Thomas |
| 2010/0299252 A1 | 11/2010 | Thomas |
| 2010/0299260 A1 | 11/2010 | Thomas |
| 2010/0299262 A1 | 11/2010 | Handler |
| 2010/0323446 A1 | 12/2010 | Barnett et al. |
| 2010/0324986 A1 | 12/2010 | Thomas |
| 2010/0325036 A1 | 12/2010 | Thomas |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0004514 A1 | 1/2011 | Thomas |
| 2011/0004546 A1 | 1/2011 | Thomas |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0029427 A1 | 2/2011 | Haggerty et al. |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0060673 A1 | 3/2011 | Delinsky et al. |
| 2011/0066618 A1 | 3/2011 | Sigurbjornsson et al. |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0112950 A1 | 5/2011 | Haggerty et al. |
| 2011/0113084 A1 | 5/2011 | Ramnani |
| 2011/0113086 A1 | 5/2011 | Long et al. |
| 2011/0113096 A1 | 5/2011 | Long et al. |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137765 A1 | 6/2011 | Nonaka |
| 2011/0142213 A1 | 6/2011 | Baniak et al. |
| 2011/0145899 A1 | 6/2011 | Cao et al. |
| 2011/0148625 A1 | 6/2011 | Velusamy |
| 2011/0164746 A1 | 7/2011 | Nice et al. |
| 2011/0166988 A1* | 7/2011 | Coulter ............... G06Q 40/00 705/38 |
| 2011/0167011 A1 | 7/2011 | Paltenghe et al. |
| 2011/0178841 A1 | 7/2011 | Rane et al. |
| 2011/0179139 A1 | 7/2011 | Starkenburg et al. |
| 2011/0184780 A1 | 7/2011 | Alderson et al. |
| 2011/0196791 A1 | 8/2011 | Dominguez |
| 2011/0211445 A1 | 9/2011 | Chen |
| 2011/0219421 A1 | 9/2011 | Ullman et al. |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270754 A1 | 11/2011 | Kelly et al. |
| 2011/0276396 A1 | 11/2011 | Rathod |
| 2011/0295733 A1 | 12/2011 | Megdal et al. |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2012/0005070 A1 | 1/2012 | McFall et al. |
| 2012/0011158 A1 | 1/2012 | Avner et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066106 A1 | 3/2012 | Papadimitriou |
| 2012/0072382 A1 | 3/2012 | Pearson et al. |
| 2012/0078932 A1 | 3/2012 | Skurtovich, Jr. et al. |
| 2012/0084866 A1 | 4/2012 | Stolfo |
| 2012/0089438 A1 | 4/2012 | Tavares et al. |
| 2012/0101938 A1 | 4/2012 | Kasower |
| 2012/0101939 A1 | 4/2012 | Kasower |
| 2012/0110467 A1 | 5/2012 | Blake et al. |
| 2012/0110677 A1 | 5/2012 | Abendroth et al. |
| 2012/0123931 A1 | 5/2012 | Megdal et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0151045 A1 | 6/2012 | Anakata et al. |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0185515 A1 | 7/2012 | Ferrel et al. |
| 2012/0198556 A1 | 8/2012 | Patel et al. |
| 2012/0215682 A1 | 8/2012 | Lent et al. |
| 2012/0215719 A1 | 8/2012 | Verlander |
| 2012/0216125 A1 | 8/2012 | Pierce |
| 2012/0235897 A1 | 9/2012 | Hirota |
| 2012/0239497 A1 | 9/2012 | Nuzzi |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0265661 A1 | 10/2012 | Megdal et al. |
| 2012/0278217 A1* | 11/2012 | Sui ............... G06Q 20/4016 705/35 |
| 2012/0278767 A1 | 11/2012 | Stibel et al. |
| 2012/0290660 A1 | 11/2012 | Rao et al. |
| 2012/0297484 A1 | 11/2012 | Srivastava |
| 2012/0317014 A1 | 12/2012 | Cerise et al. |
| 2012/0324388 A1 | 12/2012 | Rao et al. |
| 2013/0006825 A1 | 1/2013 | Robida et al. |
| 2013/0006843 A1 | 1/2013 | Tralvex |
| 2013/0018811 A1 | 1/2013 | Britti et al. |
| 2013/0031109 A1 | 1/2013 | Roulson et al. |
| 2013/0031624 A1 | 1/2013 | Britti et al. |
| 2013/0066775 A1 | 3/2013 | Milam |
| 2013/0080467 A1 | 3/2013 | Carson et al. |
| 2013/0085804 A1 | 4/2013 | Leff et al. |
| 2013/0103571 A1 | 4/2013 | Chung et al. |
| 2013/0110557 A1 | 5/2013 | Kasower |
| 2013/0110565 A1 | 5/2013 | Means et al. |
| 2013/0117072 A1 | 5/2013 | Nish |
| 2013/0117087 A1 | 5/2013 | Coppinger |
| 2013/0125010 A1 | 5/2013 | Strandell |
| 2013/0132151 A1 | 5/2013 | Stibel et al. |
| 2013/0173447 A1 | 7/2013 | Rothschild |
| 2013/0173449 A1 | 7/2013 | Ng et al. |
| 2013/0173450 A1 | 7/2013 | Celka et al. |
| 2013/0173451 A1 | 7/2013 | Kornegay et al. |
| 2013/0173481 A1 | 7/2013 | Hirtenstein et al. |
| 2013/0185293 A1 | 7/2013 | Boback |
| 2013/0205135 A1 | 8/2013 | Lutz |
| 2013/0211986 A1 | 8/2013 | Debie et al. |
| 2013/0267171 A1 | 10/2013 | Sarkar et al. |
| 2013/0279676 A1 | 10/2013 | Baniak et al. |
| 2013/0293363 A1 | 11/2013 | Plymouth |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2014/0012733 A1 | 1/2014 | Vidal |
| 2014/0012737 A1 | 1/2014 | Evans |
| 2014/0019348 A1 | 1/2014 | Daley |
| 2014/0032300 A1* | 1/2014 | Zhang et al. ............... 705/14.35 |
| 2014/0032723 A1 | 1/2014 | Nema |
| 2014/0046872 A1 | 2/2014 | Arnott et al. |
| 2014/0061302 A1 | 3/2014 | Hammad |

(56) References Cited

U.S. PATENT DOCUMENTS

| | | | |
|---|---|---|---|
| 2014/0089166 A1 | 3/2014 | Padawer | |
| 2014/0089167 A1 | 3/2014 | Kasower | |
| 2014/0089191 A1 | 3/2014 | Brown | |
| 2014/0096249 A1 | 4/2014 | Dupont et al. | |
| 2014/0110477 A1 | 4/2014 | Hammad | |
| 2014/0129942 A1 | 5/2014 | Rathod | |
| 2014/0156500 A1 | 6/2014 | Lassen et al. | |
| 2014/0156501 A1 | 6/2014 | Howe | |
| 2014/0156503 A1 | 6/2014 | Lassen et al. | |
| 2014/0164112 A1 | 6/2014 | Kala | |
| 2014/0164398 A1 | 6/2014 | Smith et al. | |
| 2014/0164519 A1 | 6/2014 | Shah | |
| 2014/0180919 A1 | 6/2014 | Brown | |
| 2014/0258083 A1 | 9/2014 | Achanta et al. | |
| 2014/0258084 A1 | 9/2014 | Padawer et al. | |
| 2014/0279329 A1* | 9/2014 | Dancel | 705/35 |
| 2014/0298485 A1 | 10/2014 | Gardner | |
| 2014/0317023 A1 | 10/2014 | Kim | |
| 2014/0379554 A1 | 12/2014 | Grossman et al. | |
| 2015/0178829 A1 | 6/2015 | Weiss | |
| 2015/0310543 A1 | 10/2015 | Debie et al. | |
| 2015/0324920 A1 | 11/2015 | Wilson et al. | |
| 2015/0326580 A1 | 11/2015 | McMillan et al. | |

FOREIGN PATENT DOCUMENTS

| | | |
|---|---|---|
| EP | 0 913 789 | 5/1999 |
| EP | 1 239 378 | 1/2002 |
| EP | 1 301 887 | 4/2003 |
| EP | 1 850 278 | 10/2007 |
| GB | 2 102 606 | 2/1983 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-016261 | 1/2003 |
| JP | 2003-271851 | 9/2003 |
| JP | 2003-316881 | 11/2003 |
| JP | 2005-208945 | 8/2005 |
| KR | 10-2000-0036594 | 7/2000 |
| KR | 10-2000-0063995 | 11/2000 |
| KR | 2000-0063313 | 11/2000 |
| KR | 10-2001-0016349 | 3/2001 |
| KR | 10-2001-0035145 | 5/2001 |
| KR | 10-2002-0007132 | 1/2002 |
| KR | 2002-0039203 | 5/2002 |
| KR | 10-2004-0078798 | 9/2004 |
| KR | 10-2007-0081504 | 8/2007 |
| WO | WO 91/16691 | 10/1991 |
| WO | WO 00/11574 | 3/2000 |
| WO | WO 00/55778 | 9/2000 |
| WO | WO 01/09752 | 2/2001 |
| WO | WO 01/09792 | 2/2001 |
| WO | WO 01/57720 | 8/2001 |
| WO | WO 01/84281 | 11/2001 |
| WO | WO 02/29636 | 4/2002 |
| WO | WO 2004/031986 | 4/2004 |
| WO | WO 2004/114160 | 12/2004 |
| WO | WO 2005/010683 | 2/2005 |
| WO | WO 2005/022348 | 3/2005 |
| WO | WO 2005/033979 | 4/2005 |
| WO | WO 2006/050278 | 5/2006 |
| WO | WO 2006/069199 | 6/2006 |
| WO | WO 2006/099492 | 9/2006 |
| WO | WO 2008/022289 | 2/2008 |
| WO | WO 2008/042614 | 4/2008 |
| WO | WO 2008/054403 | 5/2008 |
| WO | WO 2008/147918 | 12/2008 |
| WO | WO 2009/064694 | 5/2009 |
| WO | WO 2009/102391 | 8/2009 |
| WO | WO 2009/117518 | 9/2009 |
| WO | WO 2010/001406 | 1/2010 |
| WO | WO 2010/062537 | 6/2010 |
| WO | WO 2010/077989 | 7/2010 |
| WO | WO 2010/132492 | 11/2010 |
| WO | WO 2010/150251 | 12/2010 |
| WO | WO 2011/005876 | 1/2011 |

OTHER PUBLICATIONS

Collins, Michael J., "Exploring the Design of Financial Counseling for Mortgage Borrowers in Default," Journal of Family and Economic Issues, Springer Science+Business Media, Mar. 13, 2007, pp. 207-226.
CreditAnalyst, Digital Matrix Systems, as printed out Mar. 4, 2008, pp. 2.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
"Credit Improvement", CreditRepair.com, Mar. 10, 2010, http://web.archive.org/web/20100310134914/http://www.creditrepair.com/credit/, as archived Mar. 10, 2010 in 2 pages.
CreditXpert Inc., CreditXpert 3—Bureau Comparison™, 2002, http://web.archive.org/web/20030608171018/http://creditxpert.com/CreditXpert%203-Bureau%20Comparison(TM)%20sample.pdf.
CreditXpert Inc., CreditXpert Credit Score & Analysis™, 2000 http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View—Experian on Jul. 7, 2003, http://www.creditxpert.com/cx_ess_app.pdf.
CreditXpert Inc., CreditXpert Essentials™, Advisor View—TransUnion on Oct. 10, 1999, http://www.creditxpert.com/cx_ess_app.pdf.
CreditXpert Inc., CreditXpert Essentials™, Applicant View—TransUnion on Oct. 10, 1999, http://www.creditxpert.com/cx_ess_app.pdf.
CreditXpert Inc., CreditXpert What-If Simulator™, 2002 http://web.archive.org/web/20030630132914/http://creditxpert.com/CreditXpert%20What-If%20Simulator(TM)%20sample.pdf.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
Elliehausen et al., The Impact of Credit Counseling on Subsequent Borrower Behavior, The Journal of Consumer Affairs, Summer 2007, vol. 41, No. 1, pp. 1-28.
Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, pp. 19.
Experian Announces PLUS Score; Experian Press Release dated Oct. 16, 2003; Experian Global Press Office.
Fair Isaac Corporation, myFICO: Calculators: Credit Assessment, [online] [retrieved on Jun. 8, 2005] Retrieved from the internet http://www.myfico.com/CreditEducation/Calculators/CreditAssessment.aspx, 2005.
Fair Isaac Corporation, myFICO: Help: FICO Score Simulator, [online] [retrieved on Jun. 8, 2005] Retrieved from the internet http://www.myfico.com/Help/Simulator.aspx?fire=5, 2005.
Fair Isaac Corporation, myFICO: Products: Suze Orman's FICO Kit Platinum, [online] [retrieved on Jun. 8, 2005] Retrieved from the internet http://www.myfico.com/Products/FICOKit/Description.aspx, 2005.

(56) References Cited

OTHER PUBLICATIONS

Fair Isaac Corporation, myFICO: Products: Suze Orman's FICO® Kit Platinum: FICO Score Check, [online] [retrieved on Jun. 7, 2005] Retrieved from the internet http://www.myfico.com/Products/FICOKit/Sample03.html, 2005.
Fair Isaac Corporation, myFICO: Sample: FICO Score Simulator: "Max Out" Your Credit Cards, [online] [retrieved on Jun. 8, 2005] Retrieved from the internet http://www.myfico.com/Content/Samples/Sample_ScoreSimulatorResults.asp?Simulation=4&ReportID.
Fair Isaac Corporation, myFICO: Sample: FICO Score Simulator: Miss Payments, [online] [retrieved on Jun. 8, 2005] Retrieved from the internet http://www.myfico.com/Content/Samples/Sample_ScoreSimulatorResults.asp?miss_payment=radiobutton&Simulation=.
Fair Isaac Corporation, myFICO: Sample: FICO Score Simulator: Pay Down Delinquent Balances First, [online] [retrieved on Jun. 8, 2005] Retrieved from the internet http://www.myfico.com/Content/Samples/Sample_ScoreSimulatorResults.asp?textfieldCC=750.
Fair Isaac Corporation, myFICO: Sample: FICO Score Simulator: Suggested Best Action, [online] [retrieved on Jun. 8, 2005] Retrieved from the internet http://www.myfico.com/Content/Samples/Sample_ScoreSimulatorResults.asp?Simulation=111&ReportID=1&Pr.
Fisher, Joseph, "Access to Fair Credit Reports: Current Practices and Proposed Legislation," American Business Law Journal, Fall 1981, vol. 19, No. 3, p. 319.
Hunt, Robert M.; Whither Consumer Credit Counseling? Buisness Review, Dec. 31, 2005, pp. 9-20.
Ideon, Credit-Card Registry that Bellyflopped this Year, Is Drawing some Bottom-Fishers, The Wall Street Journal, Aug. 21, 1995, pp. C2.
"Japan's JAAI system appraises used cars over internet", Asia Pulse, Mar. 3, 2000.
"Judging Credit: Consumers Need Better Finance Tools", News Journal, Daytona Beach, FL, Dec. 28, 2002.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lee, W.A., "Experian Eyes Payments, Mulls Deals" American Banker: The Financial Services Daily, 2pgs., New York, NY, May 30, 2003.
Lee, W.A.; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
Loshin, Intelligent Enterprise: Better Insight for Business Decisions, "Value-Added Data: Merge Ahead", Feb. 9, 2000, vol. 3, No. 3, 5 pages.
"Managing Debt?" Federal Trade Commission: Consumer Information, http://www.consumer.ftc.gov/articles/0158-managing-debt, printed Mar. 22, 2013 in 4 pages.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Miller, Joe, "NADA used-car prices go online", Automotive News, Jun. 14, 1999, p. 36.
Mint.com, http://www.mint.com/how-it-works/ printed Feb. 5, 2013 in 2 pages.
Next Card: About Us, http://web.cba.neu.edu/~awatson/NextCardCase/NextCardAboutUs.htm printer Oct. 23, 2009 in 10 pages.
Occasional CF Newsletter; http://www.halhelms.com/index.cfm?fuseaction=newsletters.oct1999; Oct. 1999.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
Planwise, http://planwise.com printed Feb. 8, 2013 in 5 pages.
Powerforms: Declarative Client-Side for Field Validation, ISSN 1386-145x, Dec. 2000.
"PremierGuide Announces Release 3.0 of Local Search Platform", Business Wire, Mar. 4, 2004, Palo Alto, CA, p. 5574.
"Qualifying for Debt Settlement", http://www.certifieddebt.com/debt/settlement-qualifications.shtml printed Jan. 9, 2013 in 2 pages.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Sawyers, Arlena, "NADA to Offer Residual Guide", Automotive News, May 22, 2000, p. 3.
Sax, Michael M., Data Collection and Privacy Protection: An International Perspective, Presentation: Managing Online Risk and Liability Conference, Aug. 31, 1999, pp. 58.
"Settling Your Debts—Part 1 in Our Debt Settlement Series", http://www.creditinfocenter.com/debt/settle_debts.shtml printed Jan. 9, 2013 in 6 pages.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.
Stein, Benchmarking Default Prediction Models: Pitfalls and Remedies in Model Validation, Moody's KMV, Revised Jun. 13, 2002, Technical Report #020305; New York.
Tao Lixin, "Shifting Paradigms with the Application Service Provider Model"; Concordia University, IEEE, Oct. 2001, Canada.
"WashingtonPost.com and Cars.com launch comprehensive automotive web site for the Washington area", PR Newswire, Oct. 22, 1998.
Watts, Craig, "Consumers Now Can Know What Loan Rate Offers to Expect Based on Their FICO Credit Score at MyFICO.com," Mar. 6, 2002, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, http://www.myfico.com/PressRoom/PressReleases/2002_05_21.aspx.
Webpage printed from http://www.magnum.net/pdfs/RapUpBrochure.pdf as printed Mar. 3, 2008.
West, David, "Neural Network Credit Scoring Models", Computers & Operations Research, vol. 27, 2000, pp. 1131-1152.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems 24 (1999), pp. 193-205.
Zoot—Instant Rules GUI, www.zootweb.com/instant_rules_GUI.html as printed Mar. 3, 2008.
Zoot—Pre-Built Standard Attributes, www.zootweb.com/credit_attributes.html as printed Mar. 3, 2008.
Zoot—Rules Management GUI, www.zootweb.com/business_rules_GUI.html as printed Mar. 3, 2008.
International Preliminary Report on Patentability and Written Opinion for Application No. PCT/US2005/041814, dated Aug. 29, 2007.

(56) References Cited

OTHER PUBLICATIONS

International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US2010/034434, dated Jun. 23, 2010.
U.S. Appl. No. 12/705,489, filed Feb. 12, 2010, Bargoli et al.
U.S. Appl. No. 12/705,511, filed Feb. 12, 2010, Bargoli et al.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now:Money Matters; as broadcasted Nov. 15, 2005 with guest Todd Davis (CEO of Lifelock); pp. 6.
Anonymous, "Credit-Report Disputes Await Electronic Resolution," Credit Card News, Chicago, Jan. 15, 1993, vol. 5, No. 19, p. 5.
Anonymous; "MBNA Offers Resolution of Credit Card Disputes," Hempstead, Feb. 2002, vol. 68, No. 2, p. 47.
Anonymous; "Feedback"; Credit Management; ABI/INFORM Global; Sep. 2006; p. 6.
Awoonor-Williams, Princess Josephine, Ph.D. "Gender and Credit: An Analysis of Women's Experience in the Credit Market", ProQuest Dissertations and Theses, 2004, pp. 148.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren; "Will you Spend to Thwart ID Theft?"; ABA Banking Journal; Apr. 2005; pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
"Consumers Gain Immediate and Full Access to Credit Score Used by Majority of U.S. Lenders." PR Newswire, ProQuest Copy; Mar. 19, 2001; p. 1.
"CreditCheck Monitoring Services," Dec. 11, 2000, pp. 1, lines 21-23.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.

Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions|FamilySecure.com", http://www.familysecure.com/FAQ.aspx, dated Jul. 15, 2007 on www.archive.org.
FamilySecure.com; "Identity Theft Protection for the Whole Family | FamilySecure.com" http://www.familysecure.com/, as retrieved on Nov. 5, 2009.
"Fictitious Business Name Records", Westlaw Database Directory, http://directoy.westlaw.com/scope/default.asp?db=FBN-ALL&RS-W&VR=2.0 as printed Dec. 17, 2009, pp. 5.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Indentity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
ID Analytics, "ID Analytics® Consumer Notification Service" printed Apr. 16, 2013 in 2 pages.
ID Theft Assist, "Do You Know Where Your Child's Credit Is?" Nov. 26, 2007, http://www.idtheftassist.com/pages/story14, pp. 3.
"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
Information Brokers of America:Child ID Protection Order Form http://iboainfo.com/child-order.html dated Jul. 6, 2008 on www.archive.org.
Information Brokers of America http://iboainfo.com/child-id-protect.html dated Dec. 15, 2007 on www.archive.org.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Lan, Joe, "The Top Portfolio Management Software," http://www.aaii.com/computerizedinvesting/article/the-top-portfolio-management-software, Includes Discussion thread, Fourth Quarter 2011, pp. 17.

(56) References Cited

OTHER PUBLICATIONS

Lee, W.A.; "Experian, on Deal Hunt, Nets Identity Theft Insurer", American Banker: The Financial Services Daily, Jun. 4, 2003, New York, NY, 1 page.

Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.

Letter to Donald A. Robert from Carolyn B. Maloney, dated Oct. 31, 2007, 2 pg.

Letter to Donald A. Robert from Senator Charles E. Schumer, dated Oct. 11, 2007, 2 pg.

Letter to Harry C. Gambill from Carolyn B. Maloney, dated Oct. 31, 2007, 2 pg.

Letter to Harry C. Gambill from Senator Charles E. Schumer, dated Oct. 11, 2007, 2 pg.

Letter to Richard F. Smith from Carolyn B. Maloney, dated Oct. 31, 2007, 2 pg.

Letter to Richard F. Smith from Senator Charles E. Schumer, dated Oct. 11, 2007, 2 pg.

Li et al., "Automatic Verbal Information Verification for User Authentication", IEEE Transactions on Speech and Audio Processing, vol. 8, No. 5, Sep. 2000, pp. 585-596.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, Various Pages, www.lifelock.com/, 2007.

Littwin, Angela, "Beyond Usury: A Study of Credit-Card Use and Preference Among Low-Income Consumers", Texas Law Review, vol. 86, No. 3, pp. 451-506; Feb. 2008.

Lobo, Jude, "MySAP.com Enterprise Portal Cookbook," SAP Technical Delivery, Feb. 2002, vol. 1, pp. 1-13.

Lund, Graham, "Credit Bureau Data: Maximizing the Benefits," Credit Management, May 2004, ProQuest Central, pp. 44-45.

Magid, Lawrence, J., Business Tools: When Selecting an ASP Ensure Data Mobility, Los Angeles Times, Los Angeles, CA, Feb. 26, 2001, vol. C, Issue 4, pp. 3.

Manilla, http://www.manilla.com/how-it-works/ printed Feb. 5, 2014 in 1 page.

Meyers et al., "Using Your Social Networking Accounts to Log Into NPR.org," NPR.org, Jun. 24, 2010, http:/web.archive.org/web/20100627034054/http://www.npr.org/blogs/inside/2010/06/24/128079309/using-your-social-networking-accounts-to-log-into-npr-org in 3 pages.

Micarelli et al., "Personalized Search on the World Wide Web," The Adaptive Web, LNCS 4321, 2007, pp. 195-230.

Microsoft, "Expand the Reach of Your Business," Microsoft Business Solutions, 2004, in 16 pages.

Mint.com, http://www.mint.com/ printed Sep. 18, 2008 in 2 pages.

MS Money Software by Microsoft http://www.microsoft.com/Money/default.mspx as retrieved on Sep. 17, 2008.

Mvelopes, http://www.mvelopes.com/ printed Feb. 5, 2014 in 2 pages.

My Call Credit http://www.mycallcredit.com/products.asp?product=ALR dated Dec. 10, 2005 on www.archive.org.

My Call Credit http://www.mycallcredit.com/rewrite.asp?display=faq dated Dec. 10, 2005 on www.archive.org.

My ID Alerts, "Why ID Alerts" http://www.myidalerts.com/why-id-alerts.jsps printed Apr. 3, 2012 in 2 pages.

My ID Alerts, "How it Works" http://www.myidalerts.com/how-it-works.jsps printed Apr. 3, 2012 in 3 pages.

MyReceipts, http://www.myreceipts.com/ printed Oct. 16, 2012 in 1 page.

MyReceipts—How it Works, http://www.myreceipts.com/howItWorks.do printed Oct. 16, 2012 in 1 page.

"Name Availability Records", Westlaw Database Directory, http://directoy.westlaw.com/scope/default.asp?db=NA-ALL&RS=W&VR=2.0 as printed Dec. 17, 2009, pp. 5.

National Alert Registry Launches RegisteredOffendersList.org to Provide Information on Registered Sex Offenders, May 16, 2005, pp. 2, http://www.prweb.com/printer/240437.htm accessed on Oct. 18, 2011.

National Alert Registry Offers Free Child Safety "Safe From Harm" DVD and Child Identification Kit, Oct. 24, 2006. pp. 2, http://www.prleap.com/pr/53170 accessed on Oct. 18, 2011.

National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.

"New for Investors: Asset Allocation, Seasoned Returns and More," Prosper, http://blog.prosper.com/2011/10/27/new-for-investors-asset-allocation-seasoned-returns-and-more/, pp. 4.

Ogg, Erica, "Apple Cracks Down on UDID Use", http://gigaom.com/apple/apple-cracks-down-on-udid-use/ printed Nov. 5, 2012 in 5 Pages.

Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.

People Finders, http://www.peoplefinders.com/?CMP=Google&utm_source=google&utm_medium=cpc printed Nov. 16, 2010 in 1 page.

People Lookup, "Your Source for Locating Anyone!" www.peoplelookup.com/people-search.html printed Nov. 16, 2010 in 1 page.

People Search, "The Leading Premium People Search Site on the Web," http://www.peoplesearch.com printed Nov. 16, 2010 in 2 pages.

PersonalCapital.com, http://www.personalcapital.com/how-it-works printed Feb. 5, 2014 in 5 pages.

Planet Receipt—Home, http://www.planetreceipt.com/home printed Oct. 16, 2012 in 2 pages.

Planet Receipt—Solutions & Features, http://www.planetreceipt.com/solutions-features printed Oct. 16, 2012 in 2 pages.

Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CS; Oct. 1, 2007.

Privacy Rights Clearinghouse, "Identity Theft: What to do if it Happens to You," http://web.archive.org/web/19990218180542/http://privacyrights.org/fs/fs17a.htm printed Feb. 18, 1999.

Quantix Software, "Investment Account Manager," available at https://www.youtube.com/watch?v=1UwNTEER1Kk, as published Mar. 21, 2012.

Quicken Online by Intuit http://www.quicken.intuit.com/, as retrieved on Sep. 17, 2008.

"Quicken Support", pp. 6, http://web.archive.org/web/20071231040130/http://web.intuit.com/support/quicken/docs/d_qif.html Ramaswamy, Vinita M., Identity-Theft Toolkit, The CPA Journal, Oct. 1, 2006, vol. 76, Issue 10, pp. 66-70.

Rawe, Julie; "Identity Thieves", Time Bonus Section, Inside Business, Feb. 2002, pp. 2.

Repici et al., "The Comma Separated Value (CSV) File Format", http://creativyst.com/Doc/Articles/CSV/CSV01.htm, Creativyst, Inc., 2002, pp. 10.

Roth, Andrew, "CheckFree to Introduce E-Mail Billing Serving," American Banker, New York, Mar. 13, 2001, vol. 166, No. 49, pp. 3.

SAS, "SAS® Information Delivery Portal", Fact Sheet, 2008, in 4 pages.

Scholastic Inc.:Parent's Request for Information http://www.scholastic.com/inforequest/index.htm dated Feb. 10, 2007 on www.archive.org.

(56) References Cited

OTHER PUBLICATIONS

Scholastic Inc.:Privacy Policy http://www.scholastic.com/privacy.htm dated Jan. 27, 2007 on www.archive.org.
Screenshot for Investment Account Manager v.2.8.3, published at http://www.aaii.com/objects/get/1642.gif by at least Aug. 30, 2011 in 1 page.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq.article/196.aspx.
Singletary, Michelle, "The Littlest Victims of ID Theft", The Washington Post, The Color of Money, Oct. 4, 2007.
Stauffer et al., "Using HTML 3.2," Second Edition, 1996, Que Publishing, pp. 192-193.
"TransUnion—Child Identity Theft Inquiry". TransUnion. https://www.transunion.com/corporate/personal/fraudIdentityTheft/fraudPrevention/childIDInquiry.page, accessed on Nov. 5, 2009.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wesabe.com <http:/www.wesabe.com/>, as retrieved on Sep. 17, 2008.
Yahoo! Search, "People Search," http://people.yahoo/com printed Nov. 16, 2010 in 1 page.
Yodlee | Money Center, http://yodleemoneycenter.com/ printed Feb. 5, 2014 in 2 pages.
You Need a Budget, http://www.youneedabudget.com/features printed Feb. 5, 2014 in 3 pages.
Credit Plus, Inc., "Score Wizard", http://web.archive.org/web/20030806080310/www.creditplus.com/scorewizard.asp, as archived Aug. 6, 2003 in 1 page.
"Equifax: Debt Wise™ Credit Monitoring Service," Product Review, http://www.mdmproofing.com/lym/reviews/equifax/debt-wise/, Jan. 2010, pp. 11.
Equifax; "Places", http://web.archive.org/web/20111111113930/http://www.equifax.com/places as archived Nov. 11, 2011 in 1 page.
Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Fenner, Peter, "Mobil Address Management and Billing for Personal Communications", 1st International Conference on Universal Personal Communications, 1992, ICUPC '92 Proceedings, pp. 253-257.
Irby, LaToya, "How Will a Late Payment Hurt My Credit Score?" http://web.archive.org/web/20101024113603/http://credit.about.com/od/credit.about.com/od/creditscorefaq/f/how-late-payment-affects-credit-score.htm, Oct. 24, 2010, pp. 1.
Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.
Shin, Laura, "See an Error on Your Credit Report? Credit Karma Now Makes It Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
"Disputes in Cyberspace 2001: Update of online dispute resolution for consumers in cross-border disputes", Consumers International, Nov. 2001, pp. 45, http://web.archive.orgiweb/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830. 23244269.

* cited by examiner

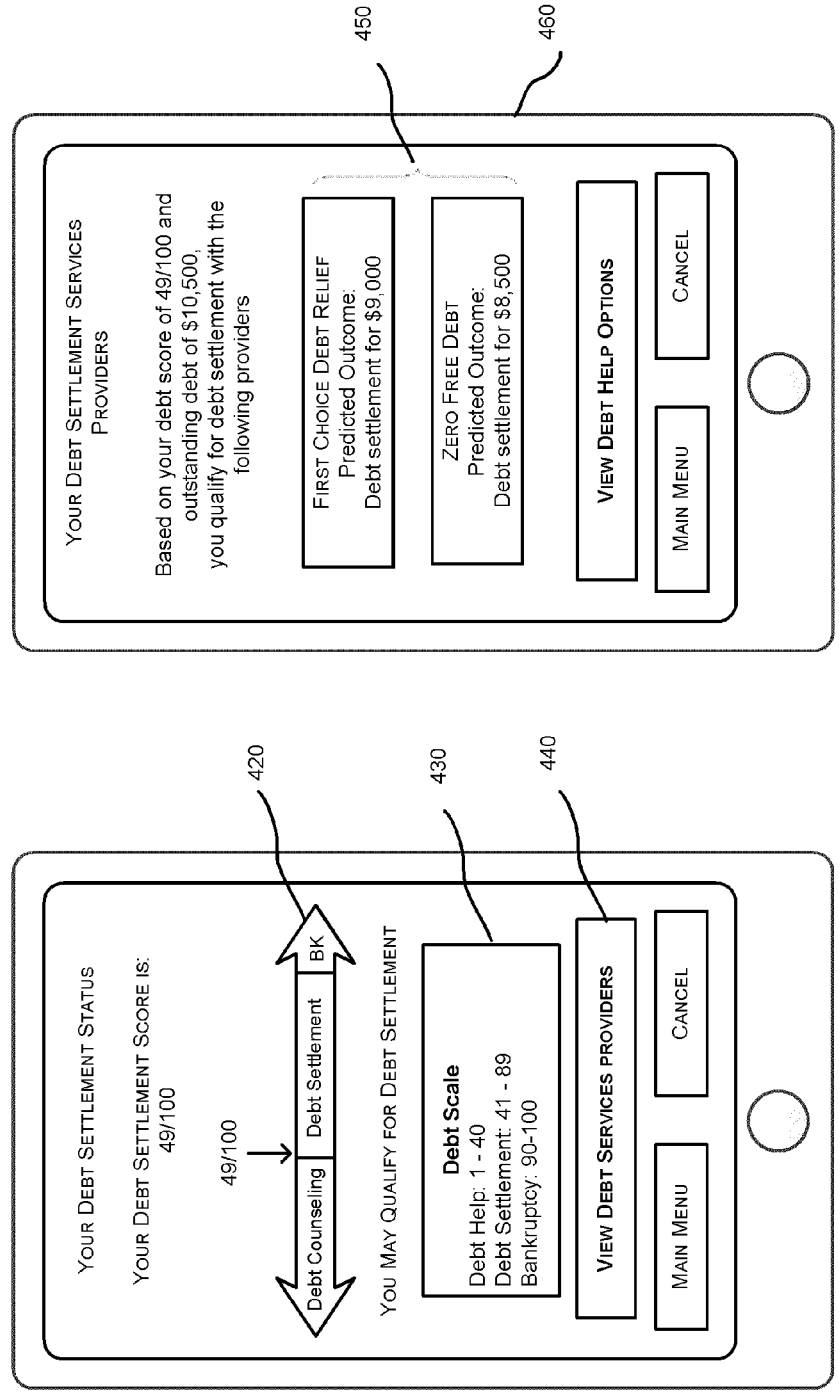

FIGURE 7

DEBT SERVICES CANDIDATE LOCATOR

CROSS-REFERENCE TO RELATED APPLICATIONS

This application is a divisional of U.S. patent application Ser. No. 13/651,127, filed Oct. 12, 2012, which is based on and claims priority to U.S. Provisional Application No. 61/546,898, filed on Oct. 13, 2011, the entirety of which is hereby incorporated herein by reference.

BACKGROUND

Debt settlement, also known as debt arbitration, debt negotiation or credit settlement, is an approach to debt reduction in which the debtor and creditor agree on a reduced balance that will be regarded as payment in full. Agreement is typically reached in view of actions by a debt settlement service provider on behalf of a consumer. Consumers that are interested in debt settlement may contact such a debt settlement service provider, provide personal and financial information to the company, and request that the debt settlement service provider contact the consumer's creditors and work out a debt settlement. However, there are many consumers that may be eligible for some form of debt settlement, but are unaware that they qualify for the debt settlement. Accordingly, such consumers may never contact a debt settlement service and request debt settlement services.

SUMMARY

Many consumers that may be eligible for debt settlement services are unaware that they qualify for debt settlement or other debt services. Consequently, these consumers may never contact a debt settlement service or request debt settlement services. Thus, it would be advantageous for these consumers and their creditors to be able to quickly identify whether this type of consumer is eligible for debt settlement.

Described herein, among other things, are systems and methods for enabling a requesting entity to identify and locate candidates for debt settlement services, such as debt help, debt settlement, and/or bankruptcy. Once identified, the consumers may be contacted (via any medium, such as voice call, text message, email, direct mail, etc.) with indications of possible eligibility for one or more debt services, specific information of the consumer that was accessed to determine that the consumer is a good candidate for the indicated debt services, details on the indicated debt services, predicted outcomes, and/or any other information regarding financial data of the consumers or the indicated debt services. Alternatively, consumers operating user devices may request information regarding eligibility for debt services from the debt settlement candidate locator.

In one embodiment, a method of identifying and locating debt settlement candidates comprises receiving a request for a debt score for a consumer, accessing credit data of the consumer, calculating a debt score based on at least the accessed credit data of the consumer, wherein the debt score is usable to determine a likelihood of the consumer being eligible for debt settlement, and providing a requesting entity with the debt score and/or the determined likelihood of the consumer being eligible for debt settlement.

In one embodiment, the debt score is usable to determine a likelihood of the consumer being eligible for debt help. The debt score may be usable to determine a likelihood of the consumer being qualified for bankruptcy approval. The debt score may be calculated based on one or more attributes of the credit data that have been pre-selected by the requesting entity. The debt score may be calculated based on two or more of: a credit score rank, a credit score, a ratio of revolving credit to debt, an amount of credit available, a quantity of delinquent accounts, a quantity of negative accounts, an average age of tradelines in the credit data, or a quantity of negative information in the credit data. The debt score may be further calculated based on one or more of: public record, debit, demographic, or psychographic information associated with the consumer. The credit score rank may be a percentage based on a comparison of the consumer's credit score with an average of a plurality of consumer credit scores.

In one embodiment, a method comprises calculating, by a computing system having one or more computer processors, a debt score of a consumer based on one or more credit data attributes of the consumer obtained from a credit report of the consumer, providing a user interface depicting the calculated debt score and any debt services likely available to the consumer based on the calculated debt score, wherein the user interface includes controls configured for adjustment by the consumer in order to perform hypothetical adjustments to one or more credit attributes of the consumer in order to initiate calculation of a hypothetical debt score based on the hypothetical adjustments, and updating the user interface to include debt services that are likely available to the consumer based on the hypothetical debt score.

In one embodiment, the method further comprising receiving a desired debt score via the user interface, and providing hypothetical changes to credit attributes of the consumer that result in the hypothetical debt score reaching the desired debt score. The user interface may depict at least some of the credit data attributes. The hypothetical credit score rank, credit score, revolving credit to debt ratio, credit available, delinquent accounts, negative accounts, instances of negative information on their credit report, public record data, average account age, debit, or a combination thereof may be calculated in response to receiving the desired debt score. The debt services may include one or more of bankruptcy, debt settlement, debt counseling, credit monitoring, or debt monitoring. The user interface may further depicts a debt scale displaying ranges of debt scores associated with corresponding debt services

BRIEF DESCRIPTION OF THE DRAWINGS

FIG. 6A is an illustrative user interface generated at least in part by a debt settlement candidate locator system that includes a debt scale displaying a range of debt services options.

FIG. 6B is an illustrative user interface generated at least in part by a debt settlement candidate locator system that includes available debt services providers and the predicted outcome of debt settlement with the available providers.

FIG. 7 is an illustrative webpage user interface generated at least in part by a debt settlement candidate locator system that includes interface controls configured to receive information about a consumer in order to authorize the locator system to access credit data of the consumer.

DETAILED DESCRIPTION

Figure 1:
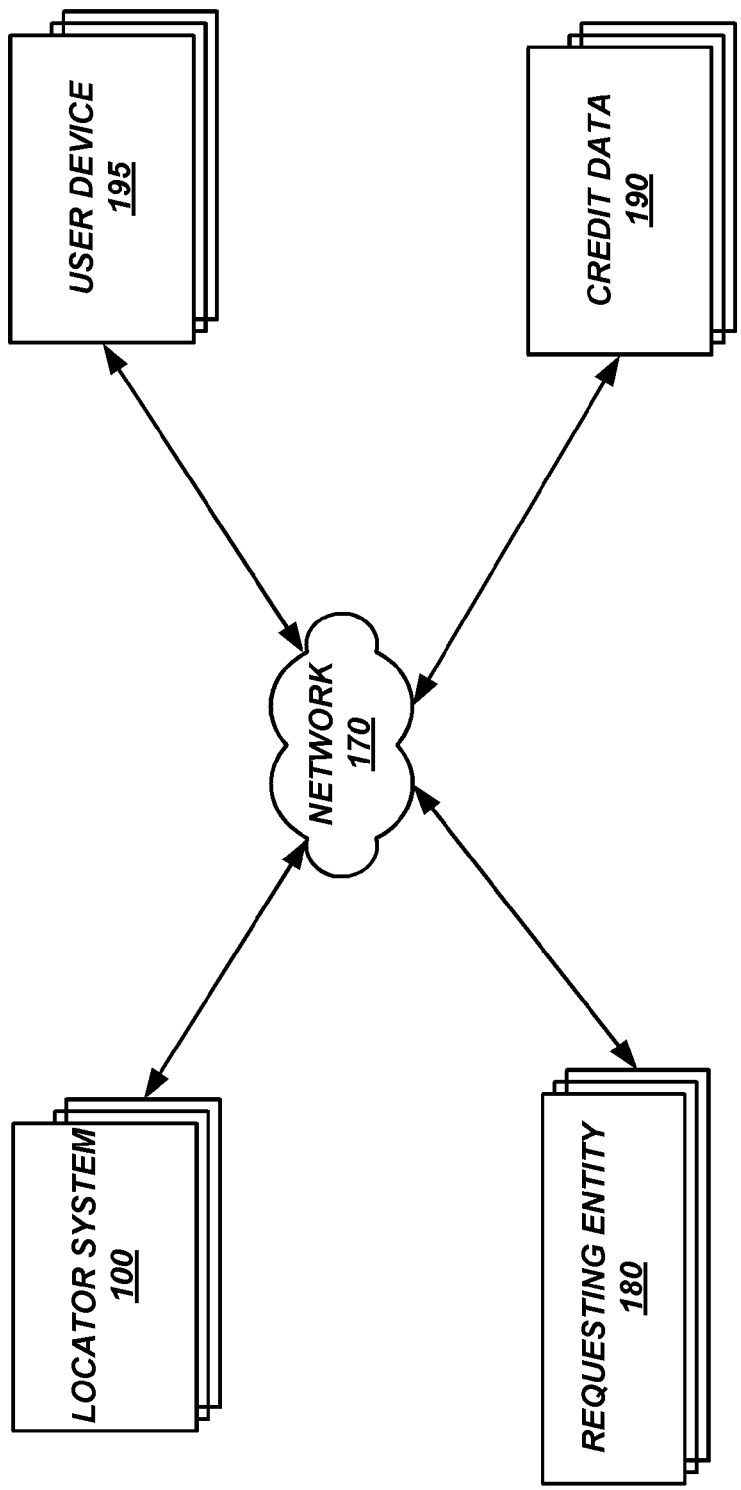
FIG. 1 is a block diagram depicting one embodiment of a locator device in communication with a user device, credit data, and requesting entity.

Although several embodiments, examples and illustrations are disclosed below, it will be understood by those of ordinary skill in the art that the subject matter described herein extends beyond the specifically disclosed embodiments, examples and illustrations and includes additional uses, obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments. In addition, some embodiments include several novel features and no single feature is solely responsible for contributing to the desirable attributes of the embodiments or is essential.

In the following detailed description, references are made to the accompanying drawings that illustrate example embodiments in which the subject matter of this disclosure may be practiced. Electrical, mechanical, programmatic and structural changes may be made to the embodiments without departing from the spirit and scope of the disclosure. Unless indicated otherwise, terms as used herein will be understood to imply their customary and ordinary meaning.

The embodiments disclosed herein describe systems and methods for identifying and locating potential candidates for debt services, such as debt help, debt settlement, and/or bankruptcy. A requesting entity, such as a credit bureau, creditor, debt settlement agency, or individual, may request generation of a debt score for a consumer by a debt settlement locator system (also referred to as "locator system") based on credit data of the consumer and/or other personal or financial information of the consumer. The credit data of the consumer is accessed and analyzed in order to identify the client's eligibility for one or more debt services, such as debt help, debt settlement, bankruptcy, and/or other debt services or financial management services. In some embodiments, the debt score may be placed on a debt scale which informs the requesting entity of one or more available debt services that the consumer may qualify for.

In one embodiment, a requesting entity, such as a debt settlement company, requests debt settlement scores and/or debt settlement services associated with the scores, for a plurality of consumers and then, based on the debt scores, contacts the consumers (via any medium, such as voice call, text message, email, direct mail, etc.) that are likely eligible for one or more debt services offered by the debt settlement company. In one embodiment, the notification to consumers may indicate that the consumer may be eligible for one or more particular debt services, e.g., debt settlement, specific information of the consumer that was accessed to determine that the consumer is a good candidate for the indicated debt services, details on the indicated debt services, predicted outcomes, and/or any other information regarding the indicated debt services.

Example System Implementation

FIG. 1 is a block diagram showing an example configuration of a debt settlement candidate locator system 100 (or "locator system 100") in communication with a requesting entity 180, credit data 190 and user device 195. In this embodiment, a requesting entity 180 communicates with the locator system 100 to identify and locate consumers that qualify for one or more debt services, such as debt settlement.

In this embodiment, the requesting entity 180 represents any entity that offers or works in connection with debt services, such as an entity that is a partner with the provider of the locator system 100. In other embodiments, the owner of the locator system 100 also offers debt services, such that the requesting entity 180 and locator system 100 are commonly owned. Additionally, in some embodiments the requesting entity 180 may be the consumer for which an indication of potentially available debt services is desired.

In one embodiment, the requesting entity, e.g., a debt settlement company, requests debt settlement eligibility information from the locator system 100 for a plurality of consumers, such as consumers on a lead list obtained by the debt settlement company. The requesting entity 180 may then contact consumers of interest, e.g., those that likely qualify for a debt settlement service offered by the debt settlement company, such as by transmitting an electronic communication to the user devices 195 of the consumers of interest. Alternatively, consumers operating user devices 195 may request information regarding eligibility for debt services directly from the locator system 100. Consumers that likely qualify for one or more debt services (e.g., based on credit data 190 obtained by the locator system 100 regarding the respective consumers) may contact one or more debt service providers, e.g., debt settlement companies, via information also provided by the locator system 100 or information independently obtained by the consumer.

In one embodiment, the locator system 100 gathers credit data from the credit data 190, which may be a credit bureau and/or agent of one or more credit bureaus, and communicates the results to a user device 195. Depending on the embodiment, the user device 195 may include any type of device, such as mobile telephones, tablets, desktop computers, etc. The user device 195 may include one or more devices that are solely used by the user and/or one or more devices that are used by the user, as well as other users (such as a public library computer that may be used by a user as well as many other library patrons). Depending on the embodiment, other systems for locating debt settlement candidates may include additional or fewer components than are illustrated in the example of FIG. 1.

Figure 2:
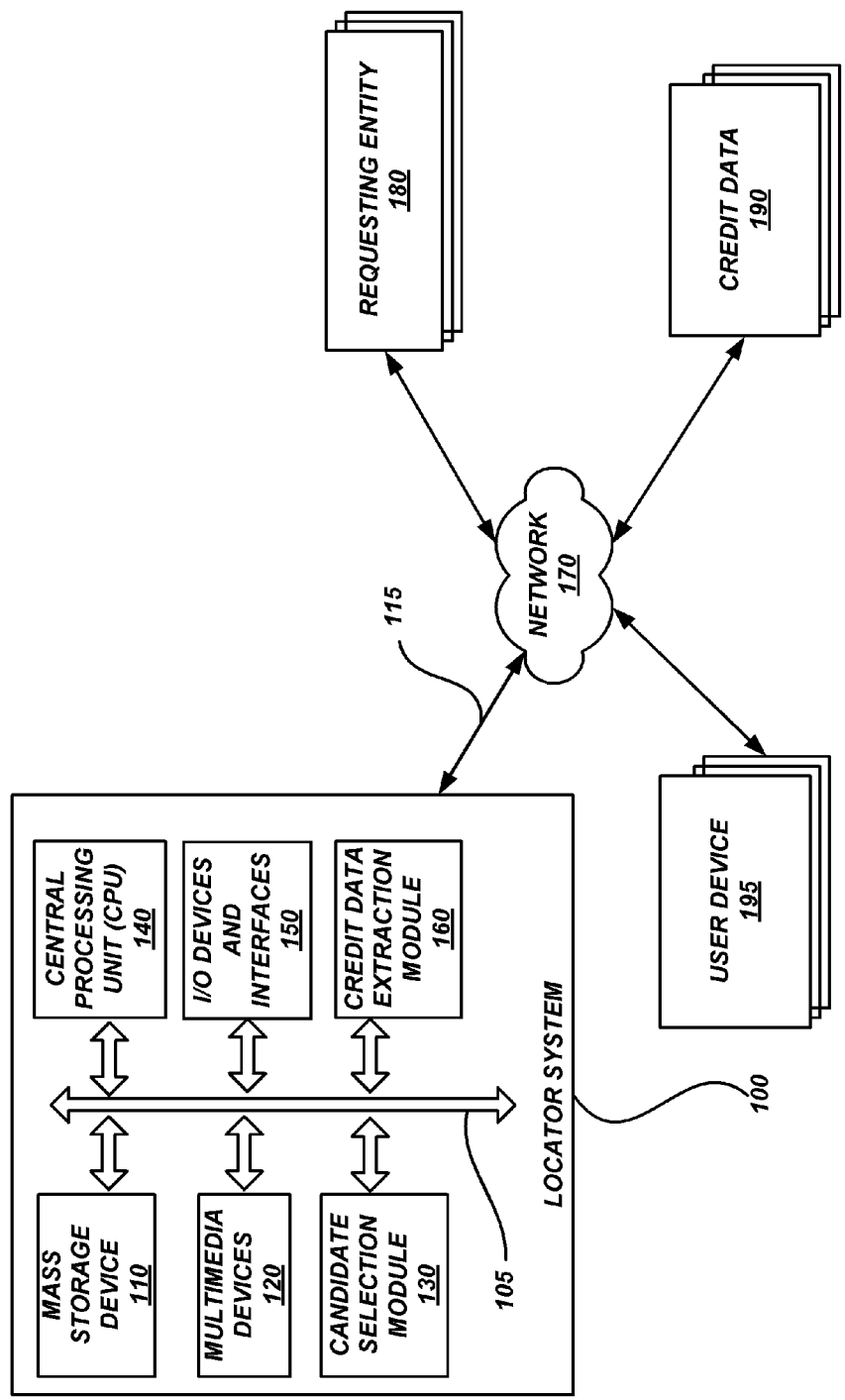
FIG. 2 is a block diagram depicting one embodiment of the debt settlement candidate locator system in communication with a network and various systems which are also in communication with the network.

FIG. 2 is a block diagram depicting one embodiment of the locator system 100 in communication with a network 170 and various systems also in communication with the network 170. The locator system 100 may be used to implement systems and methods herein. For example, the locator system 100 may receive credit data 190 of a consumer, extract data from the credit data 190, and provide a determination of the consumer's qualification (or likely qualification) for one or more debt services.

In the embodiment of FIG. 2, the locator system 100 is configured to access credit data of consumers, process the credit data to identify consumers matching predefined criteria indicative of respective consumers' eligibility for one or more debt services, and provide contact or identifying information of located consumers to a requesting entity 190, such as a debt settlement company.

In one embodiment, the credit data 190 is maintained by a credit bureau. In one embodiment, the locator system 100 is also maintained by a credit bureau, such that the link between the locator system 100 and the credit data 190 is via a secured local area network, for example. In other embodiments, a portion of the credit data from the credit data 190 is stored local to the locator system 100. Other manners of accessing credit data by the locator system 100 are also contemplated.

In the embodiment of FIG. 2, the locator system 100 includes a credit data extraction module 160 and a candidate selection module 130 that are configured for execution on the locator system 100 in order to analyze credit data and identify candidates for debt settlement, respectively. In particular, the credit data extraction module 160 is configured to access credit data of consumers, such as by retrieving credit data from a credit bureau data store or other source. In one embodiment, the credit data extraction module parses and/or extracts portions of consumer credit files or reports and provides the data to the candidate selection module 130, such as by storing on a local storage device, e.g., the mass storage device 110. In this embodiment, the candidate selection module 130 is configured to analyze the credit data provided by the credit data extraction module 160 in order to identify candidates for debt settlement. As noted above, any attributes of the consumers' credit data, and various predefined threshold levels for the respective attributes, may be considered in identifying candidates for debt services.

In one embodiment, the locator system 100 provides debt settlement candidates to multiple debt services providers, and each debt services provider may define custom rules for identifying candidates for one or more debt services provided by the respective debt services provider. For example, a debt settlement company may select credit data attributes and/or threshold levels that must be matched to qualify a consumer as a candidate for debt settlement by that particular debt settlement provider, which are different than credit attributes and/or threshold levels of other debt settlement companies. Depending on the embodiment, the candidate selection module 130 provides various information to the requesting entity 180, such as basic consumer demographic information (e.g., name, address, telephone, e-mail, etc.), or possibly more detailed information regarding the consumers credit data, such as the specific values of the credit data attributes that cause the consumer to be a candidate for debt settlement.

In one embodiment, the locator system 100 provides the requesting entity 180 with a generated debt score based on the consumer's credit data. The requesting entity may then determine the candidate's qualification for debt settlement or other debt services based on the debt score. In other embodiments, the locator system 100 provides the requesting entity 180 with a likelihood of eligibility of the candidate for each of one or more debt services. For example, the locator system 100 may transmit eligibility likelihoods (e.g., percentages or some other indicators) for each of debt help, debt settlement, and bankruptcy to the requesting entity rather than, or in addition to, a calculated debt score (such as based on an algorithm using attributes and/or thresholds defined by the requesting entity).

The requesting entity 180, upon receipt of debt scores, debt services that consumers are likely eligible for, and/or leads for debt settlement candidates identified by the locator system 100, may contact the consumers and offer debt settlement services, along with other information that may be useful in educating the consumer on the likelihood that debt settlement is a real possibility.

In one embodiment, if a consumer does not qualify or meet the requirements for debt settlement (e.g., based on system attributes/thresholds or customer-specific attributes/thresholds), the locator system 100 may present other relevant offers, utilities, tools, and/or products for financial management that the consumer can use. Thus, even for those consumers that don't qualify for debt settlement, the system may provide useful products for managing the consumer's finances, for example.

In one embodiment, credit report data of consumers that are identified as debt settlement candidates is provided to the debt settlement service for prepopulation of the consumers account/profile and/or for use in creating an offer to one or more creditors for settlement. For example, consumer demographic information, contact information, account information, summarized credit statistics, etc. may be provided to the debt settlement service. Thus, the credit data that is available to the locator system 100 may be useful to reduce the work of the debt settlement provider in establishing consumer accounts and putting together account information for purposes of debt settlement negotiations.

In one embodiment, the debt settlement service (e.g., either operated by the same entity as the candidate locator system 100, or a separate entity) negotiates with the creditors to have the debt settlement report to credit bureaus as "paid as agreed," by virtue of the new agreements between the consumer and lenders/creditors. Such debt settlement may have a reduced (or no) impact on the consumers' credit report/score, as compared to the typical "account settled" status that is reported to credit bureaus when accounts are settled via debt settlement series, which may have a negative impact on the consumers' credit report/score. In one embodiment, creditors are more willing to report the settlement as "paid as agreed" in view of the prescreening of the consumers for settlement eligibility (e.g., as discussed above) and/or the streamlining of information exchange that is possible through use of consumer information extracted from credit reports of the consumers.

Example Computing System

The locator system 100 includes, for example, a personal computer that is IBM, Macintosh, or Linux/Unix compatible or a server or workstation. In one embodiment, the locator system 100 comprises a server, a laptop computer, a cell phone, a personal digital assistant, a kiosk, or an audio player, for example. In one embodiment, the exemplary locator system 100 includes one or more central processing unit ("CPU") 140, which may each include a conventional or proprietary microprocessor.

The locator system 100 further includes one or more mass storage devices 110, such as a hard drive, diskette, solid state drive, or optical media storage device. Typically, the modules of the locator system 100 are connected to the computer using a standard based bus system 105. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA")

architectures, for example. In addition, the functionality provided for in the components and modules of the locator system 100 may be combined into fewer components and modules or further separated into additional components and modules.

The locator system 100 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the locator system 100 may be controlled by a proprietary operating system. Conventional operating systems control and schedule computer processes for execution, perform memory management, provide file system, networking, I/O services, and provide a user interface, such as a graphical user interface ("GUI"), among other things.

The locator system 100 may include one or more commonly available input/output (I/O) devices and interfaces 150, such as a keyboard, mouse, touchpad, and printer. In one embodiment, the I/O devices and interfaces 150 include one or more display devices, such as a monitor, that allows the visual presentation of data to a user. More particularly, a display device provides for the presentation of GUIs, application software data, and multimedia presentations, for example. The locator system 100 may also include one or more multimedia devices 120, such as speakers, video cards, graphics accelerators, and microphones, for example.

In the embodiment of FIG. 2, the I/O devices and interfaces 150 provide a communication interface to various external devices. In the embodiment of FIG. 2, the locator system 100 is electronically coupled to a network 170, which comprises one or more of a LAN, WAN, and/or the Internet, for example, via a wired, wireless, or combination of wired and wireless, communication link 115. The network 170 communicates with various computing devices and/or other electronic devices via wired or wireless communication links.

According to FIG. 2, information is provided to the locator system 100 over the network 170 from one or more data sources. The data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 2, the locator system 100 also includes modules 130, 160 that may be stored in the mass storage device 110 as executable software codes that are executed by the CPU 140. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, the locator system 100 is configured to execute the modules 130, 160 in order to identify candidates for debt settlement, as well as any other functionality described elsewhere in this specification.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Figure 3:
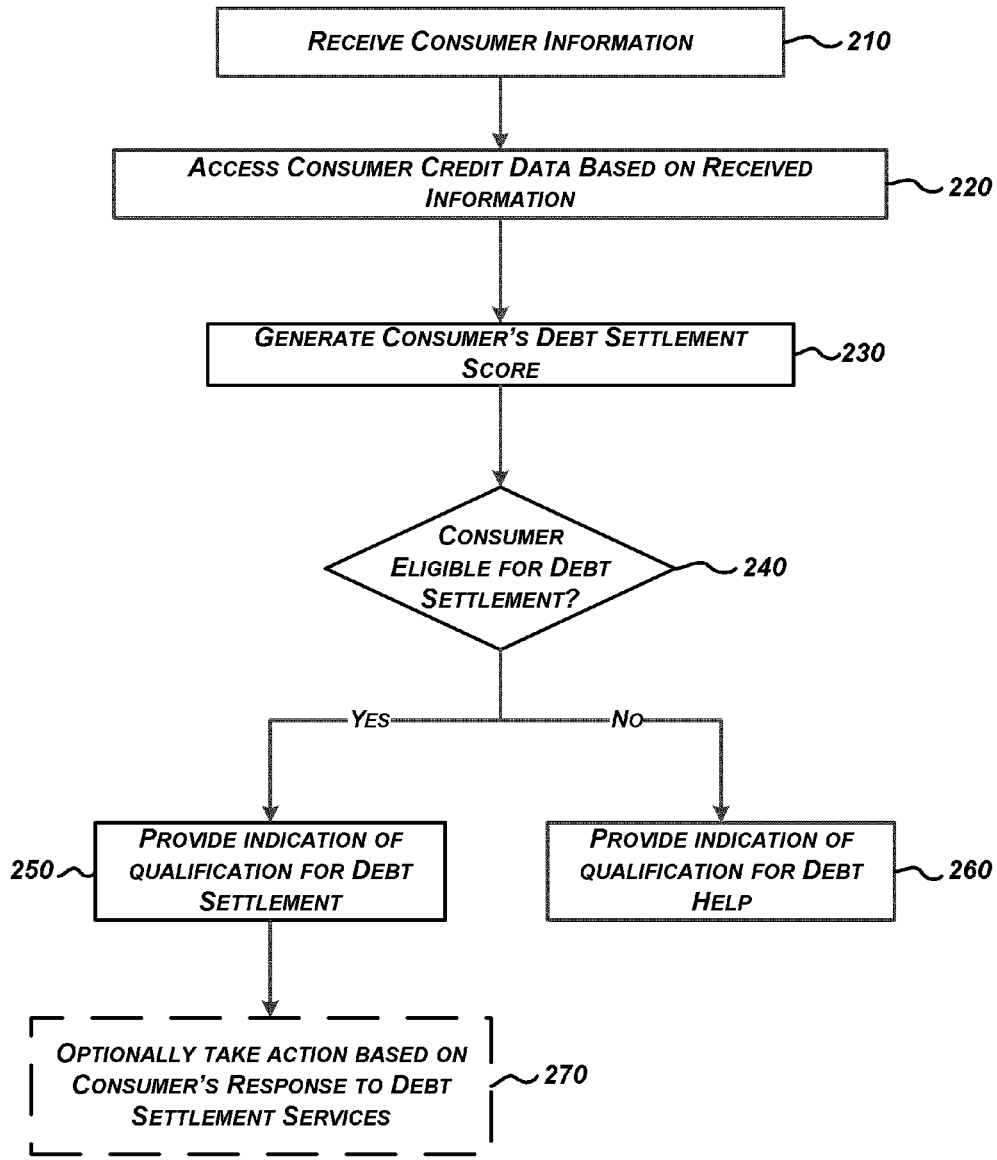
FIG. 3 is a flowchart illustrating one embodiment of a method for identifying and locating a debt settlement candidate.

FIG. 3 is a flowchart illustrating one embodiment of a method of identifying and locating debt settlement candidates. The method may be performed, for example, by a locator system 100 of FIG. 1, or by other suitable computing systems. In an embodiment, the method shown in FIG. 3 may be performed substantially in real time so that the requesting entity (or consumer) is presented with debt services qualification information without substantial delay. FIG. 3 illustrates an embodiment where a requesting entity is attempting to locate candidates for one or more debt settlement services. However, a similar method may be performed in response to a consumer's request for debt settlement services qualification information. In various embodiments, fewer blocks or additional blocks may be included in the process, or various blocks may be performed in an order different from that shown in FIG. 3.

At block 210, the locator system 100 receives information regarding one or more consumers from a requesting entity 180, such as a debt services provider. Such information may include personal identifying information enabling the locator system 100 to determine the identity of the consumers. The information may include an authorization for the locator system 100 to access credit data of the consumers. In some embodiments, the information can be received through one or more user interfaces provided to the consumer and/or third party. Alternatively, the information may be received in other manners, such as via a batch process wherein a data structure including information regarding a plurality of consumers is transmitted by the requesting entity to the locator system 100, such as daily, weekly, or monthly. The information may be included in any available file format, such as a database, spreadsheet, or markup language format.

At block 220, the locator system 100 accesses credit data 190 of the one or more consumers. The credit data may be retrieved from one or more credit bureaus, may be stored locally on the locator system 100, may be entered by the consumer or other requesting entity, or may be maintained and/or retrieved from other sources.

The locator system 100 is configured to process the credit data to identify consumers matching predefined criteria indicative of a respective consumers' eligibility for one or more debt services, and provide the located consumers to the requesting entity. For example, consumer credit scores may be used to identify candidates for debt settlement services. In some embodiments, other data, such as credit score rank, credit available, number of delinquent accounts, and other information in consumers' credit files may be analyzed to identify candidacy for debt services. Depending on the embodiment, debt services providers may have custom rules for identifying candidates for one or more debt services provided by the respective debt services provider. The custom rules may change the debt scores and/or likely available debt services for different debt services providers.

At block 230, the locator system 100 generates a debt score based on credit data of the consumer. For example, credit score, credit available, number of delinquent accounts, and other information in consumers' credit files may be analyzed to generate a consumer's debt score. In some embodiments, credit data may also include data that is derived from credit data of consumers, such as a credit score rank that is indicative of a particular consumers credit score relative to a group of consumers. Credit score rank may rank a consumer's credit score in view of other consumers for which a particular requesting entity has previously provided a particular debt service. For example, the locator system may be provided with information from a particular debt settlement company regarding credit scores of consumers that have been successfully provided debt settlement (or other debt services) from the debt settlement company. Thus, the locator system may rank a particular consumer's credit score relative to the actual credit scores of consumers that have actually received the corresponding debt service from the debt settlement provider. In some embodiments, consumers are ranked with reference to a larger group of consumers credit scores. For example, a credit score rank may be with reference to all credit scores, or all credit scores of consumers having a particular demographic (or other) characteristic, such as consumers within a particular state, region, age range, etc. In some embodiments, more than one credit score ranking may be used in a debt score algorithm. For example, one or more of the following attributes may be used to identify consumers eligible for debt settlement services based on credit data:

| Credit attribute | Threshold |
| --- | --- |
| Credit Score rank: | e.g., under 40%, 60%, or 80% |
| Credit score: | e.g., under 500, 600, or 700 |
| Revolving credit to debt ratio: | e.g., below 48%, 60%, or 72% |
| Credit available: | e.g., below $5,000, $7,500, or $10,000. |
| Delinquent accounts | e.g., more than 0, 1, 2 |
| Negative information on their credit report | e.g., yes or specific types of negative info. |
| Public record data | e.g., yes or specific types of public record data |
| Average account age | e.g., less than 3, 5, or 7 year |

The attributes above may be individually compared to a consumer's credit data in order to determine if the consumer is eligible for debt settlement (or other debt service), or may be combined into an algorithm or model that generates a debt score usable to make a similar determination (e.g., whether that consumer is eligible for debt settlement or other debt services). For example, one implementation may generate a debt score of 55 for consumers with a credit score rank of less than 60%, with a credit score of less than 600, and at least one delinquent account. This consumer may be identified as being eligible for debt settlement. Another implementation may generate a debt score of 30 for candidates with credit scores of less than 500, with a revolving credit to debt ratio of less than 48%, and an average account age of less than 3 years. This consumer may be identified as being eligible for bankruptcy. In other embodiments, any other credit attribute or threshold may be used. Additionally, other attributes, such as demographic, debit (e.g., checking account information), psychographic (e.g., propensities, interests, etc.), or other information may be used to calculate a debt score. Any combination of the above attributes and thresholds may also be used to generate a debt score. In some embodiments, the above attributes and thresholds may be used to identify candidates for debt settlement without generating a debt score.

Depending on the debt services provider, there may be custom rules for identifying and generating a debt score. These custom rules may affect the quantity and specific consumers that are determined to likely be eligible for debt services for respective debt services providers.

At block 240, the locator system 100 determines whether, based on the respective consumer's credit data and/or debt score, the consumer is eligible for debt settlement services. If the consumer is eligible, then at block 250 the locator system 100 provides the requesting entity with an indication that the particular consumer is likely eligible for debt settlement at block 250. Such indications may be provided in a batch format, such as in response to processing the list of the plurality of consumers through the locator system.

In the embodiment of FIG. 2, if the consumer is not eligible for debt settlement at block 240, the locator system 100 provides an indication that the consumer may be eligible for debt help at block 260. In other embodiments, other debt services may be considered with reference to debt scores of consumers. Thus, rather than the two outcomes illustrated in FIG. 2, multiple outcomes may be possible in other embodiments, such that each analyzed consumer may qualify for one or more of the plurality of debt services.

Depending on the embodiment, the locator system 100 may additionally provide debt settlement options to the requesting entity 180. For example, if the requesting entity 180 is a broker of debt services (e.g. an intermediary between consumers and multiple debt services providers), the locator system 100 may be configured to provide the requesting entity 180 with best options for debt services providers to handle each of the qualifying consumers specific debt services needs. Thus, in one embodiment the locator system 100 may match a particular consumer debt score to different options from different debt services providers and provide such indications to the requesting entity 180. Accordingly, a particular consumer may qualify for debt settlement through a first debt services provider, while only qualifying for debt help through a second debt services provider.

In other embodiments, the locator system 100 provides the requesting entity 180 with a likelihood of eligibility on the candidate for each of one or more debt services. For example, the locator system 100 may transmit eligibility likelihoods (e.g., percentages or some other indicators) for each of debt help, debt settlement, and bankruptcy to the requesting entity rather than, or in addition to, a calculated debt score (such as based on an algorithm using attributes and/or thresholds defined by the requesting entity). The eligibility likelihoods can be utilized by debt services providers to determine which consumers to contact for debt settlement services or other educational resources for financial management.

In one embodiment, at block 270 the requesting entity 180 may choose to take action based on the available debt settlement services. For example, if the requesting entity 180 is a debt settlement company, it may choose to receive more information about the eligible consumer. In another example, if the requesting entity is a consumer, the consumer may choose to select one of the provided debt settlement options and engage in debt settlement.

Figure 4:
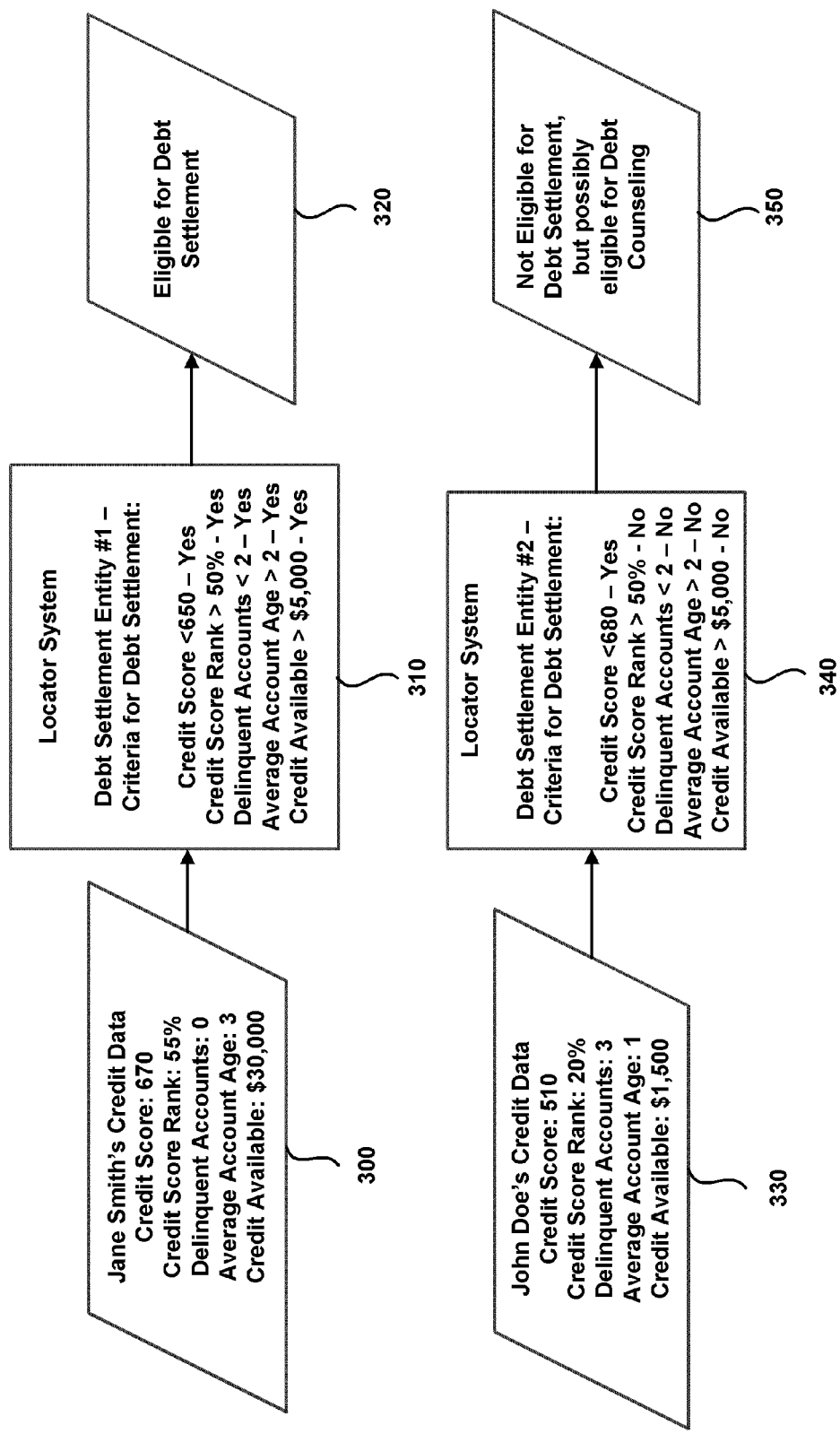
FIG. 4 is a diagram illustrating exemplary credit data of two individuals that may be accessed in in order to determine debt service options that may be available to the individuals.

FIG. 4 is a diagram illustrating an application of the debt settlement candidate locator to two candidates (e.g., Jane Smith and John Doe). In the example of FIG. 4, the Jane Smith's credit data 300 is accessed and analyzed by the locator system 310 in determining whether Jane Smith is eligible for one or more debt services. In this example, the determination of debt settlement eligibility is based on Jane Smith's credit score, credit score rank, number of delinquent accounts, average account age, and credit available. The locator system 310 may generate a debt score based on these credit attributes. That debt score may then be compared to debt settlement criteria for debt settlement entity #1 in order to determine that Jane Smith is eligible for debt settlement from that particular debt settlement.

In the example of FIG. 4, the John Doe's credit data 330 is accessed and analyzed by the locator system 340 in determining whether John Doe is eligible for one or more debt services. In this example, the determination of debt settlement eligibility is based on John Doe's credit score, credit score rank, number of delinquent accounts, average account age, and credit available. John's eligibility for debt services may be based on a debt score that is calculated based on these (or other) credit attributes, or may be based on a comparison of specific credit attributes to qualification criteria is for the debt settlement entity #2. In this example, the assessment of John Doe's credit data 350 results in a determination of non-eligibility for debt settlement, but possible eligibility for debt counseling 350. Depending on the embodiment, debt services providers may have custom credit data variables for identifying candidates for one or more debt services provided by the respective debt services provider. In some embodiments, the debt services options will vary depending on the consumer's credit data and/or debt score.

In some embodiments, the locator system 100 is configured to provide indications of consumers that are likely to be eligible for a particular debt service in the future, such as based on changes to the consumers credit attributes and/or debt score over a previous time period. For example, if debt scores range from 0-100, with 30 being the cut off for debt settlement eligibility (e.g., 30 and below qualifies for debt settlement help) for a particular debt settlement provider, an indication of possible future qualification for debt settlement may be provided for a consumer that had a debt score of 45 three months prior, 40 two months prior, and 35 in the prior month. Thus, the locator system may be usable to predict debt eligibility of consumers for debt services, which may allow the debt services provider and/or locator system to prepare consumers for quick qualification and resolution of debt issues through the debt services when available.

Sample User Interfaces

Figure 5B:
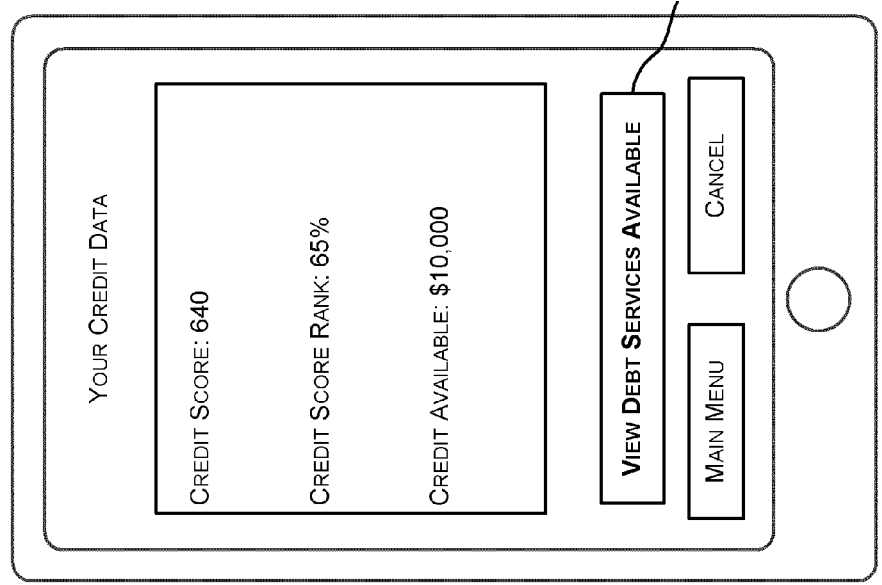
FIGS. 5A-B are illustrative user interfaces generated at least in part by a debt settlement candidate locator system that includes receiving information and displaying credit data.
Figure 5A:
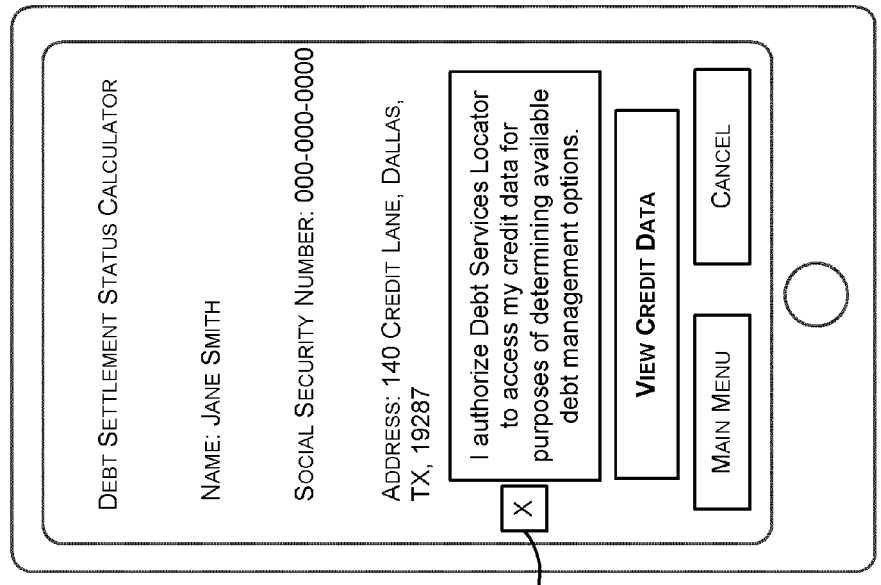

Various user interfaces and methods of displaying the debt settlement candidate locator, as well as components of the debt settlement candidate locator, may be used. For example, FIG. 5A illustrates an example user interface that allows a consumer to input identifying information and authorize access to the consumer's credit data. The user can then choose to view the accessed credit data. In the example of FIG. 5A, Jane Smith's name, social security number, and address are requested for identification purposes. Depending on the embodiment, different user inputs may be requested. Once the authorization box 400 is checked, the user can choose to view the credit data accessed and analyzed by the locator system 100. The example of FIG. 5B illustrates the display of Jane Smith's credit data. In this example, the debt services provider that provides the user interface (or is otherwise affiliated with the provider of the debt settlement status calculator) selected the customized credit data of credit score, credit score rank, and credit available to determine eligibility of the consumer. Depending on the embodiment, the displayed variables will be different customized credit data variables for identifying candidates for one or more debt services provided by the respective debt services provider. Additionally, the credit data actually used to determine a debt score and/or eligibility for debt services may not be displayed to the consumer, such as in FIG. 5B, or partially displayed to the consumer (e.g., more than the credit score, credit score rank, and credit available may be used to calculate the debt score for the consumer Jane Smith, without displaying each of the credit score attributes used).

In the embodiment of FIG. 5B, some of the credit data for the consumer has been displayed and the consumer is provided with an option 410 to view debt services options that the consumer may be eligible for based on the consumer's credit data. The debt services options may vary depending on the consumer's credit data, debt score, or the debt services provider's eligibility requirements for debt services. In some embodiments, the determination of eligibility may be based on the consumer's generated debt score. In the example of FIG. 5B, Jane Smith's calculated debt score qualifies her for debt settlement. Therefore, one or more debt services options available to Jane Smith may be indicated in response to selecting the "View Debt Services Available" option 410.

In some embodiments, a user interface displaying certain credit data of the consumer (e.g., FIG. 5B), may be bypassed so that the consumer goes directly from authorizing access to credit data (e.g., FIG. 5A), to viewing a debt score and/or credit services options available to the consumer based on the consumer's credit data and/or calculated debt score (e.g., FIGS. 6A and 6B).

In some embodiments, the manner in which the user interacts with the mobile application may be different. For example, the user may use touch screen input such as gestures to control the interface.

FIG. 6A illustrates a user interface that displays a consumer's debt score. This score is generated by the locator system 100 and is placed on a debt scale 420 which displays the user's eligibility for debt services, such as debt help, debt settlement, and/or bankruptcy. Debt scale ranges 430 indicate debt score ranges associated with each of multiple debt services. Thus, in embodiment of FIG. 6A, where lower debt scores indicate stronger financial health, a debt score from 1-40 indicates likely qualification for debt help, a debt score between 41-89 indicates likely qualification for debt settlement, while a debt score between 90-100 indicates likely qualification for accuracy. In other embodiments, any other scoring range may be used, such as a range from 320-820, 0-10, A-F, and the like. Additionally, in different embodiments lower debt scores may indicate weaker financial help, such as the lowest scores being indicative of qualification for bankruptcy.

Depending on the embodiment, the debt scale 420 and debt scale ranges 430 may be based on averages across multiple debt services providers, such as may be compiled by the locator system 100 or another entity. In other embodiments, the debt scale 420 is based on ranges provided by debt services providers that are currently offering services to consumers. Thus, the consumer is provided with indications of likely qualification for only those debt services to which a debt services provider is currently available. In some embodiments, the consumer may select a particular debt services provider and be provided with the debt scale associated with that particular debt services provider. Alternatively, the consumer may select debt services providers within a particular geographic region around the consumer, such as within the same state as the consumer. In any of these embodiments, the debt scores may be based on different algorithms, such as debt score algorithms associated with one or more selected debt services provider.

In this embodiment, the user can elect to view and/or engage one or more debt services providers that offer the debt services for which the consumer is likely qualified. For example, the consumer may select button 440 in order to receive a list of one or more debt services providers associated with the particular debt services for which the consumer is likely qualified.

FIG. 6B illustrates a user interface that displays the available debt services providers based on a consumer's credit data and/or debt score. In the example of FIG. 6B, the consumer's credit data and/or debt score qualifies the consumer for debt settlement with the displayed debt services providers 450. In one embodiment, the user interface may display predicted debt settlement outcomes based on the user's selected debt settlement services option. In the example of FIG. 6B, the user interface displays the corresponding predicted outcomes for each of the displayed debt services providers 450. In some embodiments, the predicted outcome can be in the form of a percentage, rating, or another indicator. In one embodiment, the predicted outcome can be based on the debt score, outstanding debt, or other custom credit data from the debt services provider. If the user chooses not to proceed with debt settlement, the user can view debt help options 460 (or some other debt services options). In some embodiments, the generated results from the user interface can be stored for a period of time (e.g., a day or a week). The user can then easily access the results upon revisiting the user interface.

In one embodiment, the debt service provider (e.g., either operated by the same entity as the candidate locator system 100, or a separate entity) negotiates with the creditors to have the debt settlement report to credit bureaus as "paid as agreed," by virtue of the new agreements between the consumer and lenders/creditors. Such debt settlement may have a reduced (or no) impact on the consumers' credit report/score, as compared to the typical "account settled" status that is reported to credit bureaus when accounts are settled via debt settlement series, which may have a negative impact on the consumers' credit report/score. In one embodiment, creditors are more willing to report the settlement as "paid as agreed" in view of the prescreening of the consumers for settlement eligibility (e.g., as discussed above) and/or the streamlining of information exchange that is possible through use of consumer information extracted from credit reports of the consumers.

Figure 7:
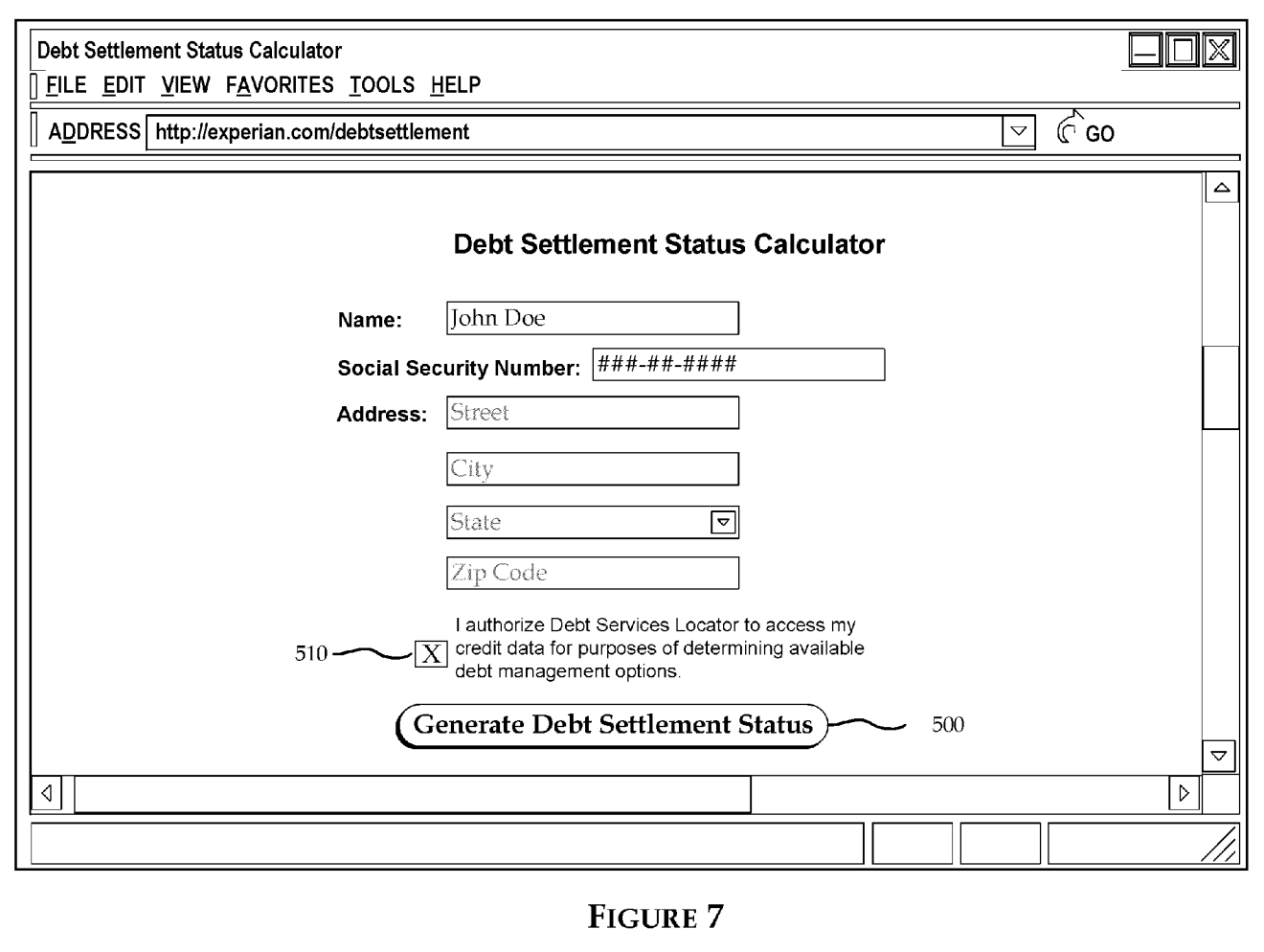

FIG. 7 illustrates an online user interface that allows a consumer to input identifying information and authorize access to the consumer's credit data. The consumer provides personal information and then selects checkbox 510 to authorize the locator system to access credit data of the consumer. Once the information is provided and the authorization checkbox 510 is checked, the consumer can select button 500 in order to initiate generation of the consumer's debt settlement status. In one embodiment, the consumer can request to view the debt settlement status in conjunction with any other financial management or debt settlement program.

Figure 8:
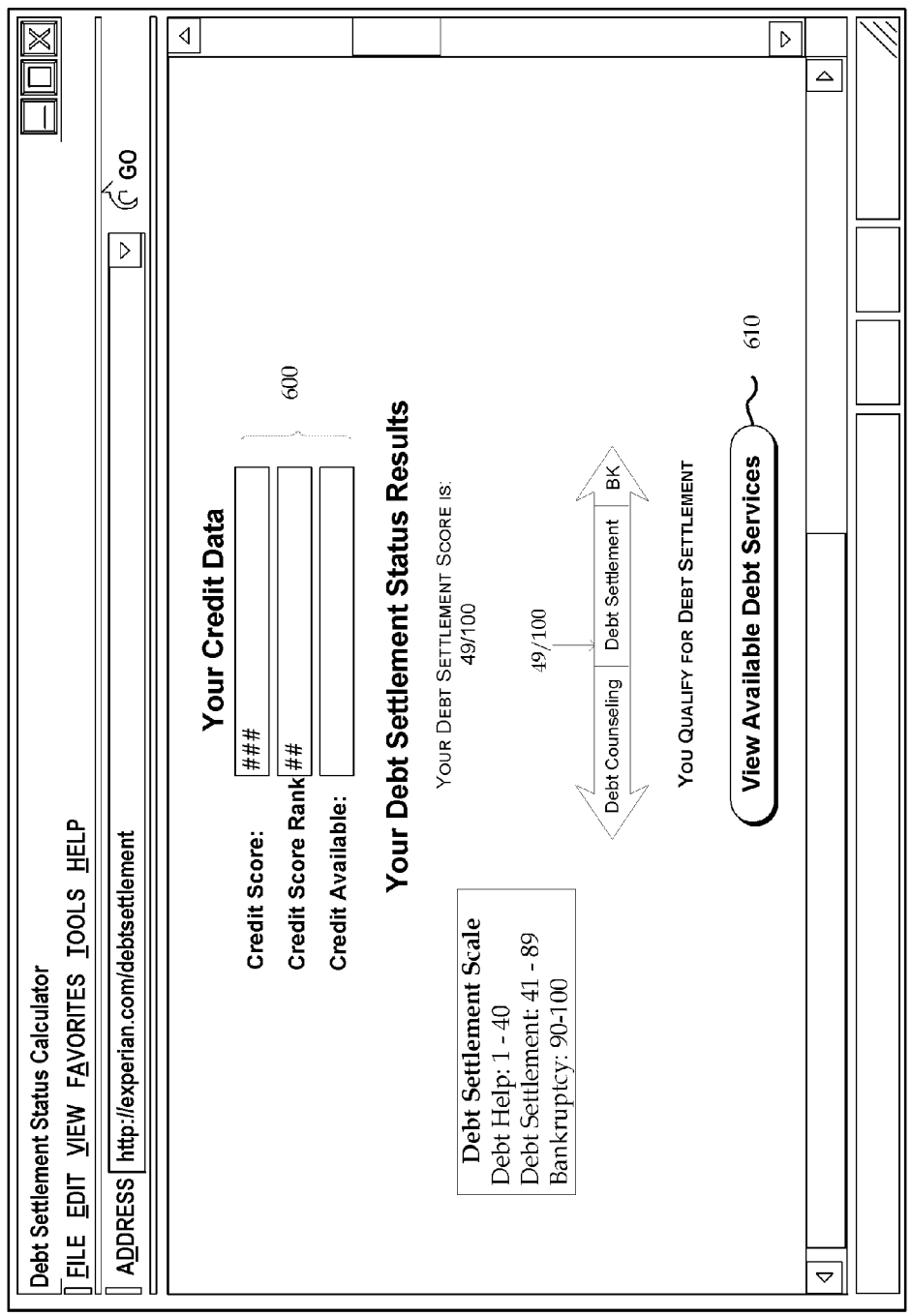
FIG. 8 is an illustrative webpage user interface generated at least in part by a debt settlement candidate locator system that includes a debt scale displaying a range of debt services options.

FIG. 8 illustrates an online user interface that displays the user's credit data, debt score, and debt services for which the consumer may qualify. In some embodiments, the displayed variables 600 will be custom credit data attributes that are used by a particular one or more debt services provider to determine the consumer's eligibility for debt services options. For example, debt services providers that are available to provide debt services in a particular geographic region of the consumer may have a particular preference for credit data attributes that should be used in determining eligibility for debt services and/or a debt score for consumers within that area.

In some embodiments, credit data may also include data that is derived from credit data of consumers, such as a credit score rank that is indicative of a particular consumers credit score relative to a group of consumers. Credit score rank may rank a consumer's credit score in view of other consumers for which a particular requesting entity has previously provided a particular debt service. For example, the locator system 100 may be provided with information from a particular debt settlement company regarding credit scores of consumers that have been successfully provided debt settlement (or other debt services) from the debt settlement company. Thus, the locator system 100 may rank a particular consumer's credit score relative to the actual credit scores of consumers that have actually received the corresponding debt service from the debt settlement provider. In some embodiments, consumers are ranked with reference to a larger group of consumers credit scores. For example, a credit score rank may be with reference to all credit scores, or all credit scores of consumers having a particular demographic (or other) characteristic, such as consumers within a particular state, region, age range, etc. In some embodiments, more than one credit score ranking may be used in a debt score algorithm.

In some embodiments, the debt services information provided in response to the consumer selecting the view available debt services button 610 will vary depending on the consumer's credit data, debt score, and/or particular preferences of debt services companies. In this embodiment, the consumer may request to view debt services and will be directed to debt settlement services options.

Figure 9:
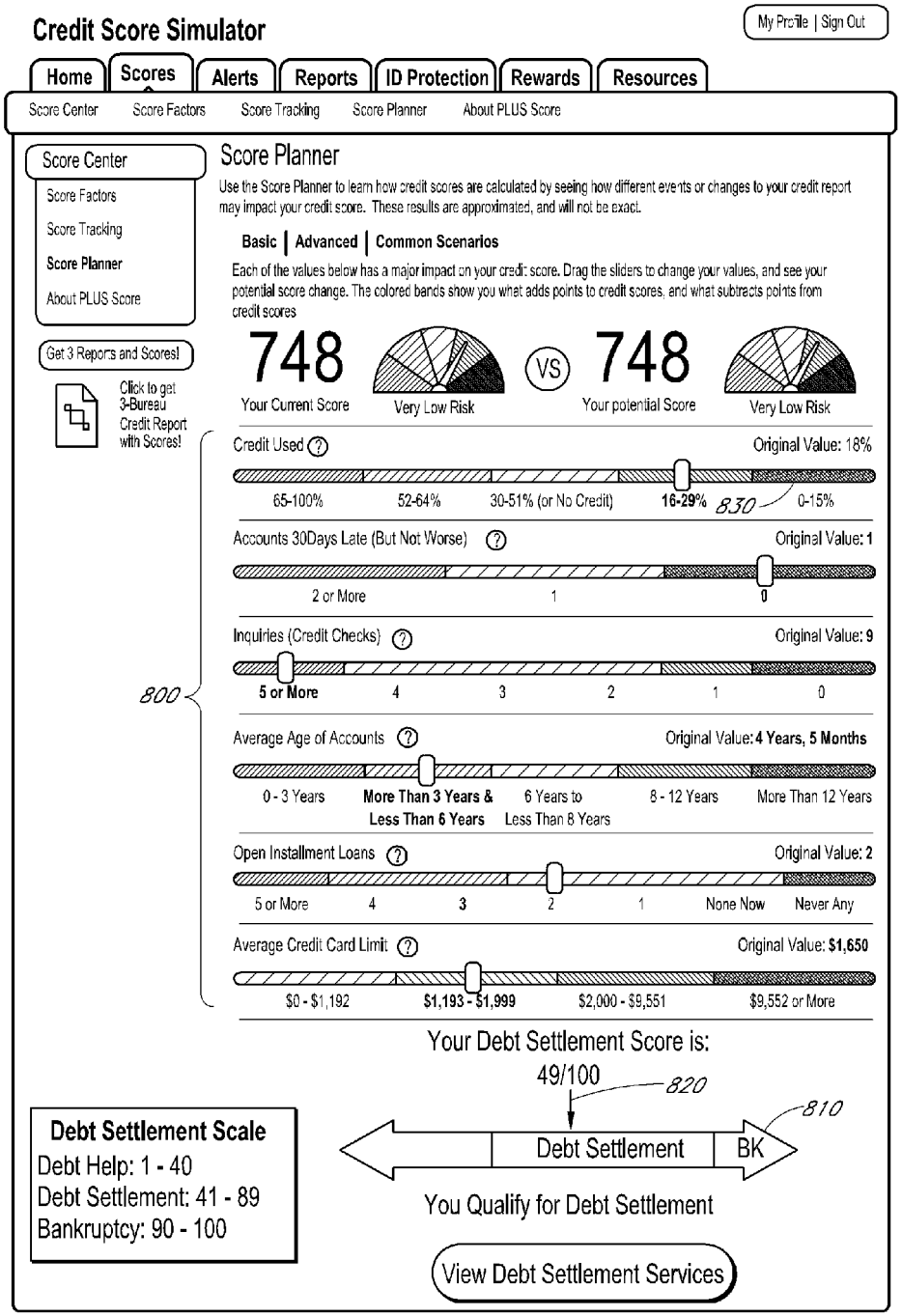
FIG. 9 illustrates one embodiment of the debt settlement candidate locator system used in conjunction with a credit score planner.

FIG. 9 illustrates a sample user interface of the debt settlement candidate locator system used in conjunction with a credit score simulator. In this embodiment, a consumer can modify various credit data variables 800 to view the corresponding change in the debt score indicator 820. This allows consumers to modify credit variables in order to initiate calculation of a simulated credit score based on those modified credit variables, as well as a simulated debt score based on those modified credit variables and/or the simulated credit score. For example, the simulated credit scores (and/or modified credit variables) may be provided to the locator system 100, which uses them to calculate a simulated debt score. For example, if the consumer is close to being eligible for debt settlement (e.g. has a debt score that is only one away from the indicated range of scores for debt settlement eligibility), the consumer can move various of the sliders 800 in order to determine how such adjustments would not only affect the consumer's credit score, but also the consumer's eligibility for debt settlement (e.g., so that the consumer can lower the debt score by at least one to qualify for debt settlement). Thus, the consumer may identify changes to the indicated credit variables that will either increase or decrease the consumer's debt score, as desired by the particular consumer (e.g., some consumers may want to decrease their debt score in order to qualify for a particular debt service, while others may want to increase their debt score in order to move further away from debt services.).

In another embodiment, a consumer can modify the debt score indicator 820 and view corresponding exemplary changes in the credit data variables 800 that would cause the consumer to have the modified debt score. For example, if the consumer moves debt score indicator 820 to indicate a different debt score, this may cause other sliders 800 or interface elements to change their colored segments and/or values. Because there may be multiple different combinations of the credit data variables that will result in a particular selected debt score, in one embodiment the consumer can adjust a particular credit data variable in order to cause other credit data variables to correspondingly move in order to maintain the selected debt score.

In other embodiments, the debt settlement candidate locator can be used in conjunction with any other financial management or debt settlement program. The user interfaces presented by the webpage may be similar to the mobile device interfaces described above, or they may be adjusted to comport with the specifications and features of the device. Other Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by an Information Display Computing Device and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computerized method of determining a user's debt services options, comprising:
   requesting, by a computing system having one or more computer processors, from a remote credit reporting system storing credit data attributes for a plurality of users, a first plurality of credit data attributes of a first user;
   applying a debt score algorithm, by the computing system to the first plurality of credit data attributes of the first user obtained from the remote credit reporting system to calculate a debt score of the first user,
      wherein the first plurality of credit data attributes used by the debt score algorithm in generating the debt score of the first user include at least:
         a credit score ranking of the first user with reference to a plurality of other users;
         a credit score of the first user; and
         a quantity of delinquent accounts of the first user;
   accessing a data structure storing at least a first threshold associated with a first debt service and a second threshold, lower than the first threshold, associated with a second debt service;
   comparing the calculated debt score of the first user to the first threshold;
   in response to determining that the calculated debt score is less than the first threshold, including the first debt service in a set of potentially available debt services;
   comparing the calculated debt score of the first user to the second threshold;
   in response to determining that the calculated debt score is less than the second threshold, including the second debt service in the set of potentially available debt services;
   generating, by the computing system, user interface data configured for rendering on a user computing device of the first user to display a user interface on a display of the user computing device, the user interface indicating at least:
      the calculated debt score;
      the set of potentially available debt services; and
      an interactive user interface controls configured to receive input from the user via the user computing device indicating an adjustment to a first credit data attribute of the first plurality of credit data attributes, the interactive user interface control comprising a slider configured for movement in two directions along a slider axis;
   in response to movement of the slider by the user, determining, based on the first credit data attribute and a location of the slider on the slider axis, a hypothetical first credit data attribute;

applying the debt score algorithm to the first plurality of credit data attributes with the first credit data attribute replaced with the hypothetical first credit data attribute to calculate a hypothetical debt score of the first user;

comparing the calculated hypothetical debt score of the first user to the first threshold;

in response to determining that the calculated hypothetical debt score is less than the first threshold, including the first debt service in a second set of potentially available debt services;

comparing the calculated hypothetical debt score of the first user to the second threshold;

in response to determining that the calculated hypothetical debt score is less than the second threshold, including the second debt service in the second set of potentially available debt services; and updating the user interface to indicate at least:
the calculated hypothetical debt score; and
the second set of potentially available debt services.

2. The computerized method of claim 1, further comprising:
receiving a desired debt score via the user interface; and
providing hypothetical changes to credit data attributes of the user that result in the hypothetical debt score reaching the desired debt score.

3. The computerized method of claim 2 further comprising:
calculating a hypothetical credit score rank, credit score, revolving credit to debt ratio, credit available, delinquent accounts, negative accounts, instances of negative information on their credit report, public record data, average account age, debit, or a combination thereof in response to receiving the desired debt score.

4. The computerized method of claim 1, wherein the debt services include one or more of bankruptcy, debt settlement, debt counseling, credit monitoring, or debt monitoring.

5. The computerized method of claim 1, wherein the user interface further depicts a debt scale displaying ranges of debt scores associated with corresponding debt services.

6. The computerized method of claim 1, wherein the user interface further depicts respective probabilities of the user being eligible for a particular debt service from each of multiple debt services providers based on the user's calculated debt score and/or hypothetical debt score.

7. The computerized method of claim 1, wherein the user interface further depicts an overall ranking of the user, based on one or more credit attributes, in comparison to other users who have received one or more debt services options for which the user is eligible.

8. The computerized method of claim 1, wherein the computing system is further configured to:
in response to hypothetical adjustments by the user to one or more credit attributes, determine hypothetical adjustments to one or more other credit attributes in order to maintain a desired hypothetical debt score.

9. The computerized method of claim 1, wherein an alert is activated on the user's computing device based on a user's preference for monitoring changes in the user's calculated debt score over a period of time.

10. The computerized method of claim 1, wherein an alert is activated on the user's computing device based on a user's preference for monitoring the user's calculated debt score being equivalent to or an improvement from the user's indicated hypothetical debt score.

11. The computerized method of claim 1, further comprising:
providing a debt services options application to a user for installation on a user computing device;
generating an alert based on at least one of the potentially available debt services for which the user qualifies based on the calculated debt score, wherein the alert comprises the at least one of the potentially available debt services and predicted outcome;
causing transmission of the alert over a wireless communication channel to the user computing device associated with the user, wherein the alert activates the application on the user computing device to cause the alert to display, and wherein the alert enables connection to the computer system over the Internet.

12. A system for determining a user's debt services options, the system comprising:
one or more computer processors configured to:
calculate a debt score of a user based on one or more credit data attributes of the user obtained from a credit report of the user;
generate a user interface configured to:
depict the calculated debt score and any debt services likely available to the user based on the calculated debt score, wherein the user interface includes a slider user interface controls configured for adjustment by the user in order to indicate hypothetical adjustments to a credit attributes of the user;
monitor movement of the slider user interface control indicating hypothetical adjustments to the credit attribute of the user, wherein a hypothetical debt score is updated based on the indicated hypothetical adjustments to the credit attribute of the user; and
update to include debt services that are likely available to the user based on the hypothetical debt score.

13. The system of claim 12, wherein the system is further configured to:
receive a desired debt score via the user interface; and
provide hypothetical changes to credit attributes of the user that result in the hypothetical debt score reaching the desired debt score.

14. The system of claim 12, wherein the user interface depicts at least some of the credit data attributes.

15. The system of claim 12, wherein a hypothetical credit score rank, credit score, revolving credit to debt ratio, credit available, delinquent accounts, negative accounts, instances of negative information on their credit report, public record data, average account age, debit, or a combination thereof is calculated in response to receiving the desired debt score.

16. The system of claim 12, wherein the debt services include one or more of bankruptcy, debt settlement, debt counseling, credit monitoring, or debt monitoring.

17. Non-transitory computer storage having stored thereon a computer program that instructs a computer system to:
calculate a debt score of a user based on one or more credit data attributes of the user obtained from a credit report of the user;
provide a user interface depicting the calculated debt score and any debt services available to the user based on the calculated debt score, wherein the user interface includes a slider user interface controls configured for adjustment by the user in order to indicate hypothetical adjustments to a credit attribute of the user;

monitor movement of the slider user interface control indicating hypothetical adjustments to the credit attribute of the user, wherein a hypothetical debt score is updated based on the indicated hypothetical adjustments to the credit attribute of the user; and update the user interface to include debt services that are likely available to the user based on the hypothetical debt score.

18. The non-transitory computer storage of claim 17, wherein the user interface further depicts a debt scale displaying ranges of debt scores associated with corresponding debt services.

19. The non-transitory computer storage of claim 17, wherein the user interface further depicts probabilities of the user being eligible for debt services with different debt services providers based on the user's calculated debt score and/or hypothetical debt score.

20. The non-transitory computer storage of claim 17, wherein the controls include one or more adjustable sliders corresponding to one or more credit attributes.

21. A computerized method of dynamically determining a user's debt services options displayed in an interactive user interface, comprising:

displaying an interactive user interface configured to receive input from a user via a user computing device, the interactive user interface indicating at least:
a calculated debt score;
a set of potentially available debt services; and
an interactive user interface control configured to receive input from the user via the user computing device indicating an adjustment to a first credit data attribute of a first plurality of credit data attributes, the interactive user interface control comprising a slider configured for movement in two directions along a slider axis;

monitoring the movement of the slider to detect a condition where the adjustment to the first credit data attribute of the first plurality of credit data attributes determines, based on the first credit data attribute and a location of the slider on the slider axis, a hypothetical first credit data attribute;

calculating a hypothetical debt score of the first user by applying a debt score algorithm to the first plurality of credit data attributes with the first credit data attribute replaced by the hypothetical first credit data attribute;

comparing the calculated hypothetical debt score of the first user to a first debt services option threshold;

in response to determining that the calculated hypothetical debt score is less than the first debt services option threshold, displaying the first debt service in the set of potentially available debt services;

comparing the calculated hypothetical debt score of the first user to a second debt services option threshold;

in response to determining that the calculated hypothetical debt score is less than the second debt services option threshold, including the second debt service in the set of potentially available debt services; and updating the user interface to indicate at least:
the calculated hypothetical debt score; and
the second set of potentially available debt services.

22. A computerized method of determining a user's debt services options, comprising:

requesting, by a computing system having one or more computer processors, from a remote credit reporting system storing credit data attributes for a plurality of users, a first plurality of credit data attributes of a first user;

applying a debt score algorithm, by the computing system to the first plurality of credit data attributes of the first user obtained from the remote credit reporting system to calculate a debt score of the first user,
wherein the first plurality of credit data attributes used by the debt score algorithm in generating the debt score of the first user include at least:
a credit score ranking of the first user with reference to a plurality of other users;
a credit score of the first user; and
a quantity of delinquent accounts of the first user;

accessing a data structure storing at least a first threshold associated with a first debt service and a second threshold, lower than the first threshold, associated with a second debt service;

comparing the calculated debt score of the first user to the first threshold;

in response to determining that the calculated debt score is less than the first threshold, including the first debt service in a set of potentially available debt services;

comparing the calculated debt score of the first user to the second threshold;

in response to determining that the calculated debt score is less than the second threshold, including the second debt service in the set of potentially available debt services;

providing a debt services options application to a user for installation on a user computing device;

receiving the first user's preferences for frequency of calculating the first user's debt score;

requesting, by the computing system, from the remote credit reporting system, a second plurality of credit data attributes of a first user;

applying the debt score algorithm, by the computing system to the second plurality of credit data attributes of the first user obtained from the remote credit reporting system to calculate a debt score of the first user over a second period of time,
wherein the second plurality of credit data attributes used by the debt score algorithm in generating the debt score of the first user include at least:
a credit score ranking of the first user with reference to a plurality of other users;
a credit score of the first user; and
a quantity of delinquent accounts of the first user;

accessing a data structure storing at least a first threshold associated with a first debt service and a second threshold, lower than the first threshold, associated with a second debt service;

generating, based on the first user's preferences for frequency of calculating the first user's debt score, an alert from at least one of the potentially available debt services for which the user qualifies based on a change in the first and second calculated debt scores, wherein the alert comprises the at least one of the change in calculated debt score, potentially available debt services and predicted outcome;

causing transmission of the alert over a wireless communication channel to the user computing device associated with the user, wherein the alert activates an application on the user computing device to cause the alert to display, and wherein the alert enables connection to the computer system over the Internet;

generating, by the computing system, user interface data configured for rendering on the user computing device of the first user to display a user interface on a display of the user computing device, the user interface indicating at least:

the calculated debt scores over the first and second periods of time;

the set of potentially available debt services; and an interactive user interface control configured to receive input from the user via the user computing device indicating an adjustment to a first credit data attribute of the first plurality of credit data attributes, the interactive user interface control comprising a slider configured for movement in two directions along a slider axis;

in response to movement of the slider by the user,
determining, based on the first credit data attribute and a location of the slider on the slider axis, a hypothetical first credit data attribute;

applying the debt score algorithm to the first plurality of credit data attributes with the first credit data attribute replaced with the hypothetical first credit data attribute to calculate a hypothetical debt score of the first user;

comparing the calculated hypothetical debt score of the first user to the first threshold;

in response to determining that the calculated hypothetical debt score is less than the first threshold, including the first debt service in a second set of potentially available debt services;

comparing the calculated hypothetical debt score of the first user to the second threshold;

in response to determining that the calculated hypothetical debt score is less than the second threshold, including the second debt service in the second set of potentially available debt services; and updating the user interface to indicate at least:
the calculated hypothetical debt score; and
the second set of potentially available debt services.

* * * * *